United States Patent [19]
Elliott

[11] 3,916,372
[45] Oct. 28, 1975

[54] METHODS AND APPARATUS FOR RECORDING WELL LOGGING MEASUREMENTS

[75] Inventor: Jennings W. Elliott, Friendswood, Tex.

[73] Assignee: Schlumberger Technology Corporation, New York, N.Y.

[22] Filed: July 12, 1973

[21] Appl. No.: 378,754

[52] U.S. Cl.......... 340/15.5 DS; 315/386; 315/392; 340/15.5 BH; 340/18 DC; 346/33 WL; 346/110 R
[51] Int. Cl.[2] ...................... G01V 1/40; H01J 29/52
[58] Field of Search ...... 340/18 R, 18 DC, 15.5 DS, 340/15.5 BH, 324 AD; 346/33 WL, 110 R; 315/22, 30, 383, 384, 385, 386, 392; 343/5 EM; 178/15

[56] References Cited
UNITED STATES PATENTS

| | | | |
|---|---|---|---|
| 2,416,200 | 2/1947 | Nagel | 315/22 |
| 3,348,229 | 10/1967 | Freas | 346/110 R |
| 3,402,388 | 9/1968 | Tucker | 346/110 R |
| 3,537,096 | 10/1970 | Hatfield | 343/5 EM |
| 3,553,640 | 1/1971 | Zemanek, Jr. | 340/15.5 DS |
| 3,588,873 | 6/1971 | Osborne | 340/324 A |
| 3,614,521 | 10/1971 | Brueschke | 315/22 |
| 3,638,066 | 1/1972 | Paine et al. | 315/22 |

*Primary Examiner*—Maynard R. Wilbur
*Assistant Examiner*—H. A. Birmiel

[57] ABSTRACT

According to one embodiment, distinctive indicia having a "three-dimensional" appearance and representative of well logging data is produced by a CRT (Cathode-ray tube) recorder by modulating both the intensity and position of the sweeping electron beam in response to variations in the data. In another embodiment, distinctive indicia in the form of a vector or arrow representative of the data is produced by sweeping the CRT electron beam in such a way that it defines an increasing spiral pattern. The electron beam is then turned on for a short pulse at the same angular position of each cycle of the spiral. For purposes of synchronization, in each of the above embodiments the beam sweep is initiated by a recurring event, such as a pulse indicative of a given incremental change in the depth level from which the data was derived. In still another embodiment, one of the above techniques is combined with presently available techniques to produce a combination log having the distinctive indicia recorded on one portion of the CRT screen and regular traces recorded on another portion of the same screen. Yet in another embodiment, alternating sweeps of the CRT electron beam are switched between two recording areas or strips on the CRT screen. A different recording medium is located adjacent each of the two recording strips thereby allowing the generation of two separate recordings. The data recorded on each medium may be completely different, or the data may be the same but recorded with different scale factors.

13 Claims, 57 Drawing Figures

AZIMUTH PULSE DETECTOR

DELAYED PULSE FROM ONE SHOT 108

ON-TIME OF AND GATE 110

OUTPUT FROM D/A CONVERTER 106

FIG. 6

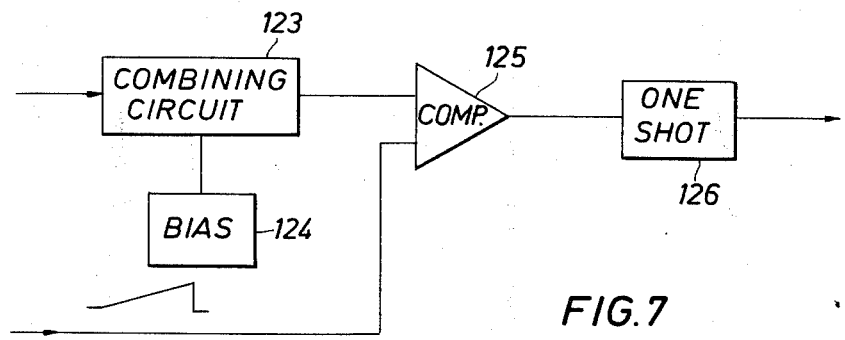
FIG.7
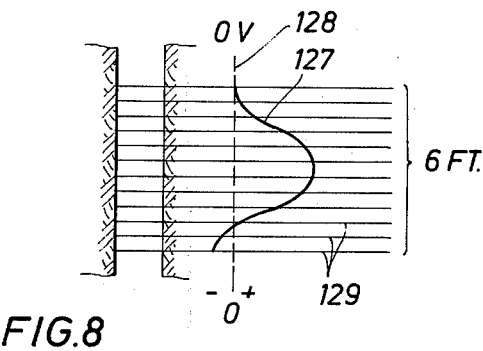
FIG.8
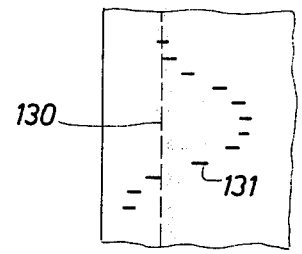
FIG.9
FIG.12
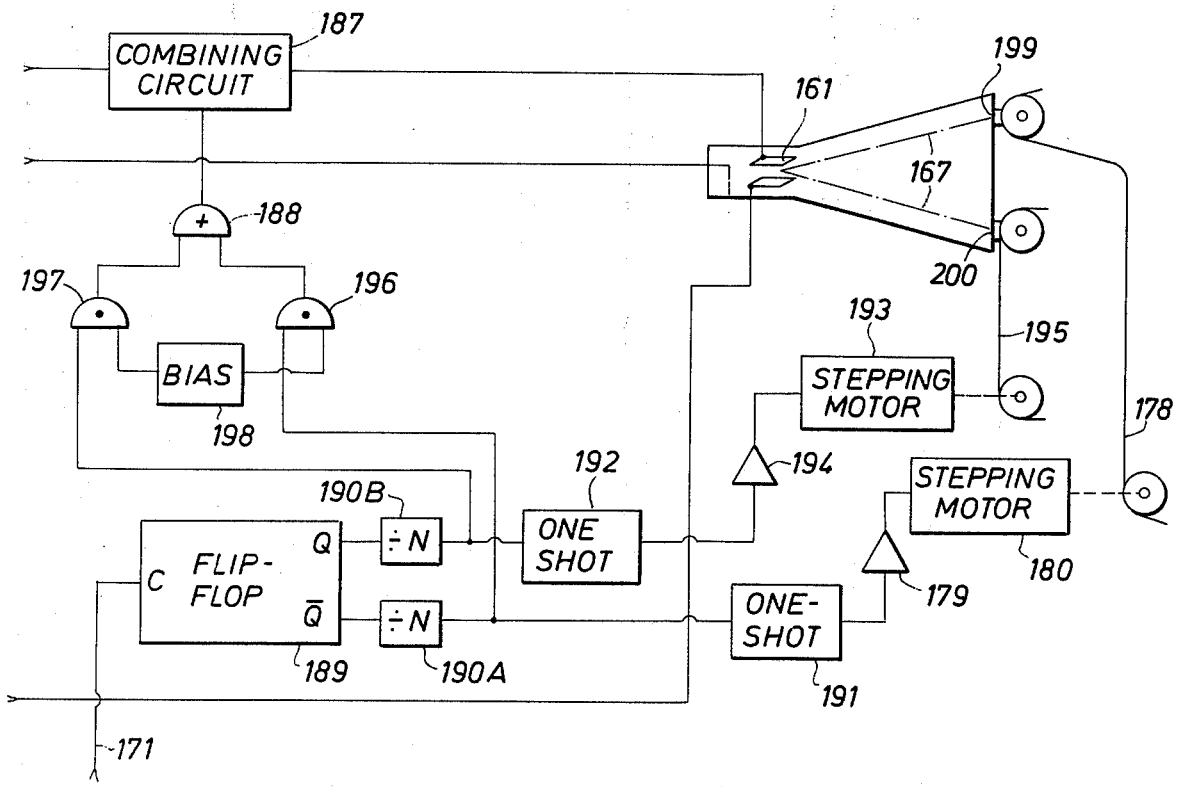

FIG.
10A 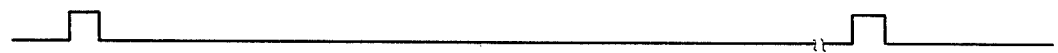
10B 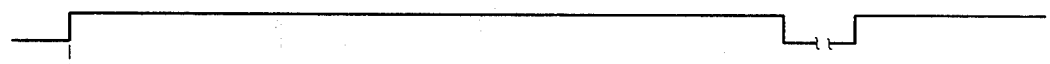
10C 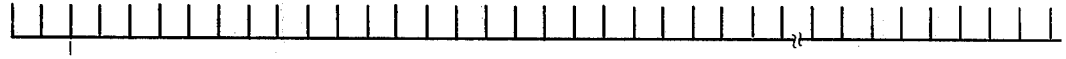
10D 
10E 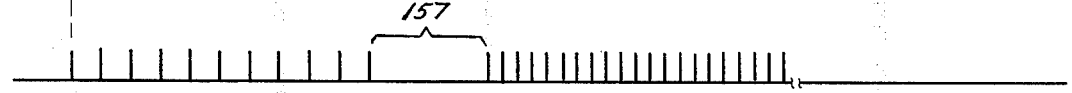
10F 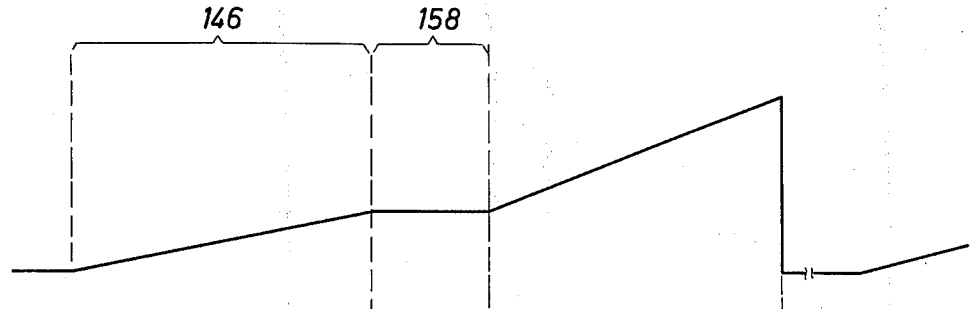
10G 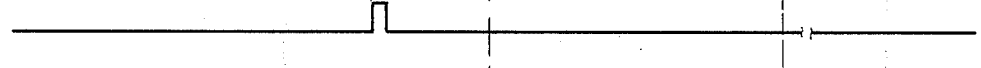
10H 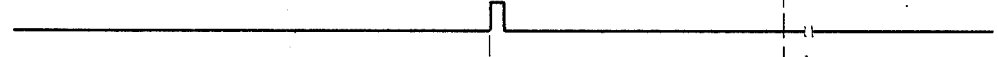
10I 
10J 

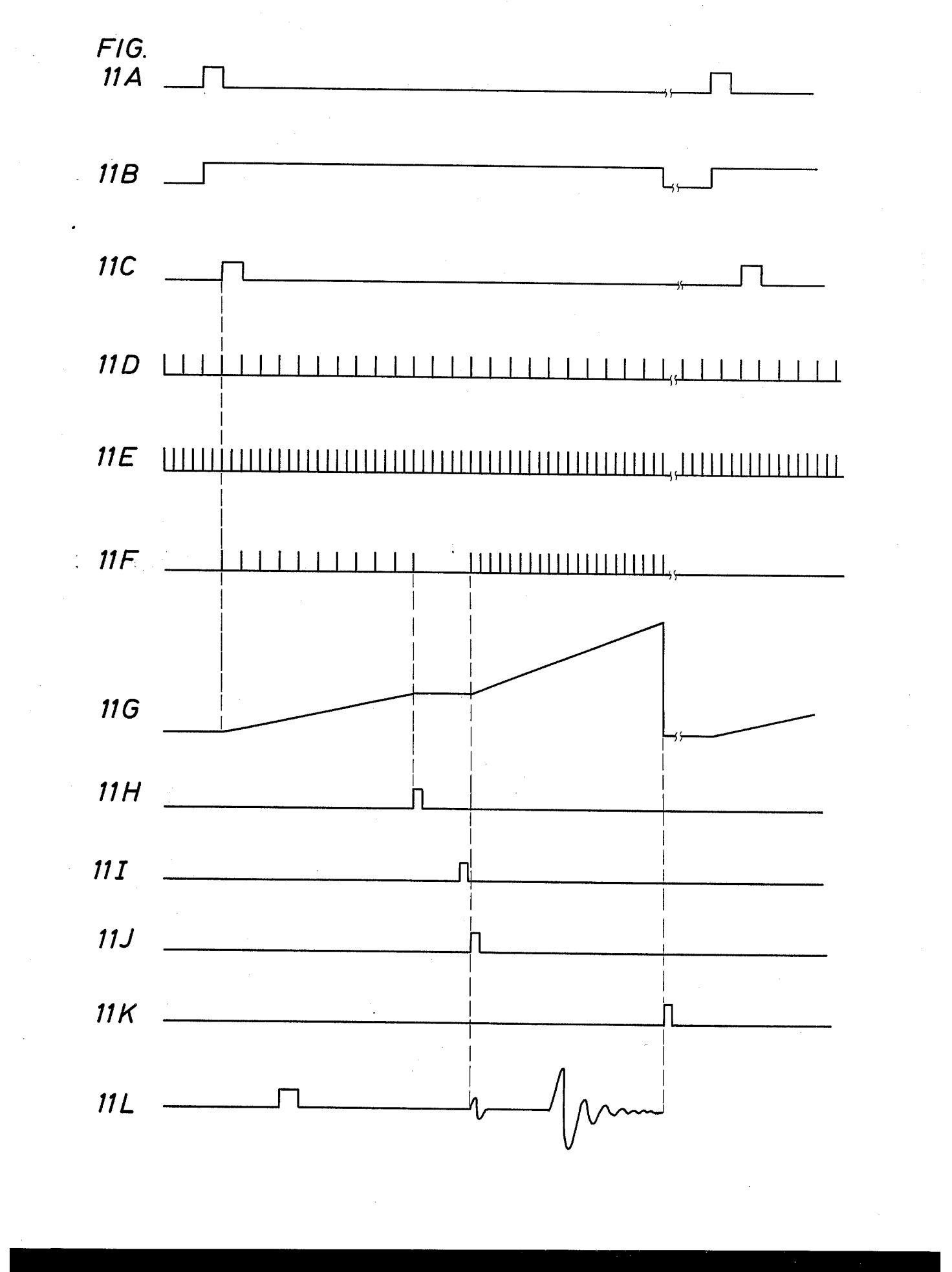

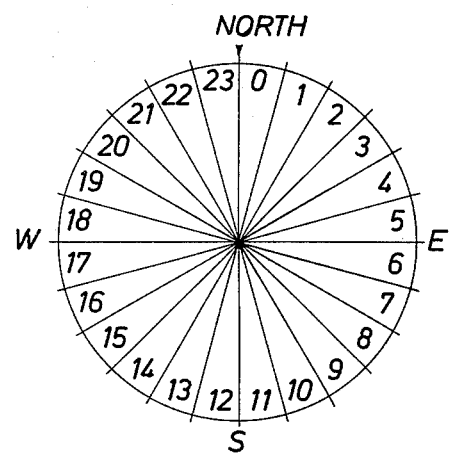
FIG. 24
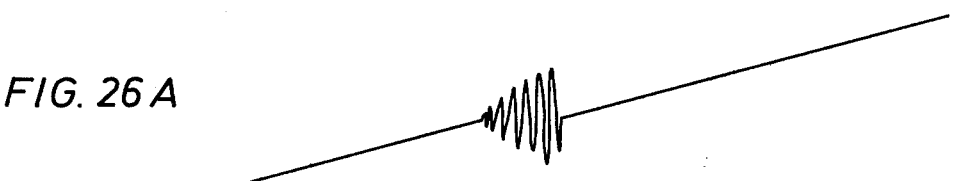
FIG. 26A
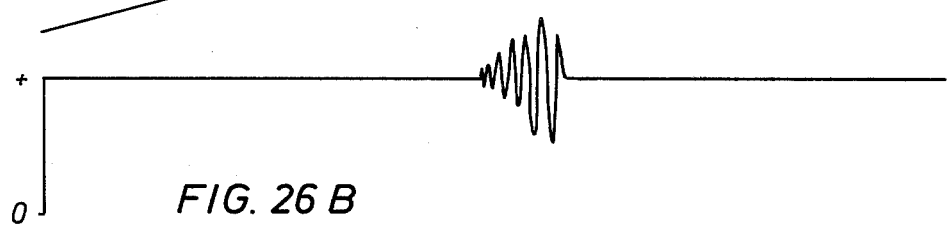
FIG. 26B
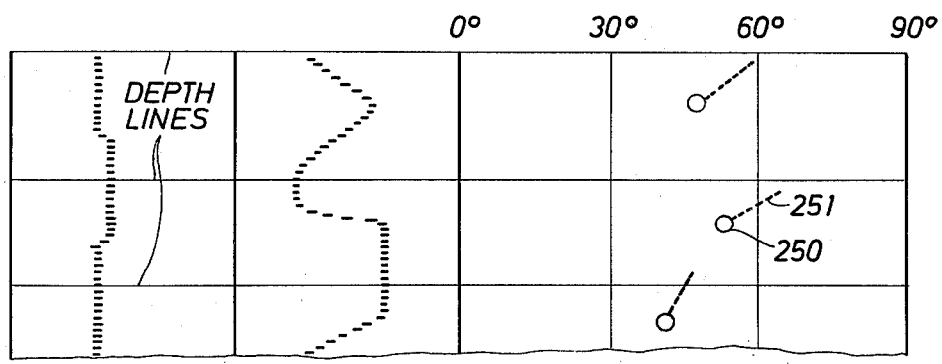
FIG. 28
FIG. 29
0   249   499   666   832   999

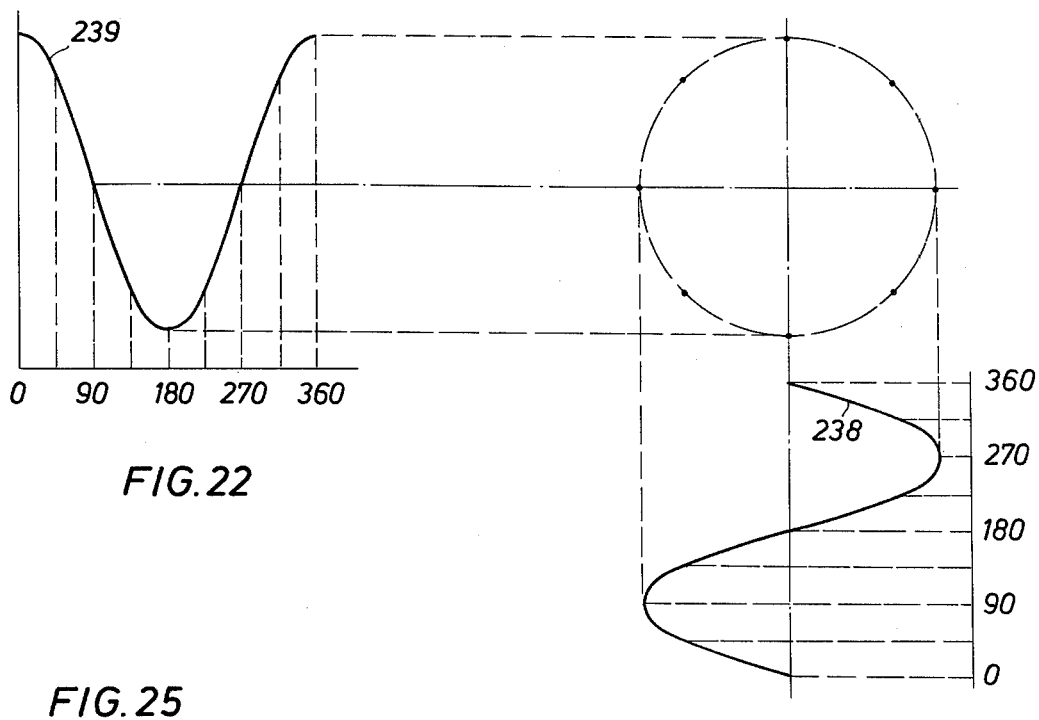
FIG. 22
FIG. 25
FIG. 23
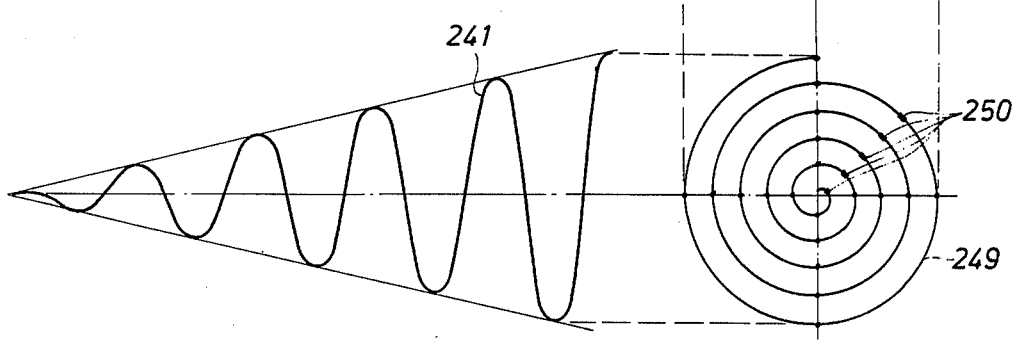

METHODS AND APPARATUS FOR RECORDING WELL LOGGING MEASUREMENTS

BACKGROUND OF THE INVENTION

In producing well logging measurements for purposes of recording, a logging tool containing one or more exploring devices is lowered into a wellbore drilled into the earth for measuring various properties of the subsurface earth formations adjacent the wellbore. Such measurements are of considerable value in determining the presence and depth of hydrocarbon bearing zones that may exist in the subsurface earth formations. There are presently in use a variety of galvanometer recorders capable of providing satisfactory well logs or recordings representative of most types of data derived from a wellbore. Some of these galvanometer recorders are specifically useful for recording a large number of different well logging data signals at one time. Examples of such recorders are described in: (1) U.S. Pat. No. 3,449,755 which issued to G. L. Samodai et al. on June 10, 1969; (2) U.S. Pat. No. 3,488,661 which issued to D. R. Tanguy on Jan. 6, 1970; and (3) U.S. Pat. No. 3,634,865 which issued to C. O. Schafer on Jan. 11, 1972. In addition, a particularly suitable CRT recorder for recording a multiplicity of well logging measurements is described in copending application Ser. No. 15,790 filed by J. W. Elliott on Mar. 2, 1970. However, not withstanding the versatility of the recorders described in the above-mentioned patents, there are certain types of well logging data which are most advantageously displayed on a log or recording in a manner which requires even more specific methods and apparatus for generating the desired display. To date, there have been many attempts to provide the necessary recording methods and apparatus to generate these unique displays.

For example, special purpose recorders have been developed for providing sonic or acoustic logs in special forms which present some unusual recording problems. A typical sonic or acoustic logging tool provides a transmitting transducer for repetitively transmitting an acoustic burst of energy into the earth formations adjoining a wellbore in response to a recurrent firing pulse. A receiving transducer then converts the received acoustical energy into electrical signals for transmission to the surface of the earth for recording. In certain types of such sonic logging systems only the travel time $\Delta t$ of the sonic energy in the formation is recorded. However, it has been recognized that valuable additional information about the earth formation may be obtained by recording and analysing the complete waveform. Therefore, it is of increasing importance that all subsequent arriving waves as well as the recurrent firing pulse or a pulse correlated with the recurrent firing pulse be recorded along with the first arriving wave or impulse.

One technique for recording the waveforms comprising such acoustic or sonic logging signals is shown in U.S. Pat. No. 3,488,658 granted to Dennis R. Tanguy on Jan. 6, 1970, wherein a glow modulator tube is utilized in conjunction with a rotating mirror to sweep an intensity modulated light beam across a recording medium. The light beam is swept at the repetition rate of the recurrent firing pulse used to drive the transmitting transducer.

Another logging apparatus used in acoustic logging is described in U.S. Pat. No. 3,302,165 granted to T. O. Anderson et al. on Jan. 31, 1967. The Anderson patent describes a method for obtaining so-called "variable-density logs" by utilizing an oscilloscope-camera combination. The intensity of the oscilloscope beam is varied in accordance with variations in the amplitude of the received well logging signal as the beam sweeps across the cathode-ray tube screen. Each successive sweep of the beam is representative of a different level in the wellbore.

In similar apparatus described in the U.S. Pat. No. 3,402,388 granted to Robert L. Tucker on Sept. 17, 1968, the beam intensity, during a predetermined number of successive sweeps, is modulated as in the Anderson patent. However, during the sweep following this predetermined number of intensity-modulated, successive sweeps, the vertical position of the beam is modulated instead of the beam intensity. After completing the sweep wherein the vertical position is modulated, the beam is again intensity-modulated for the predetermined number of sweeps. The Tucker technique results in a variable density log being produced similar to that produced by the Anderson apparatus, but which also includes a "signature" (the vertical position modulated trace) at spaced intervals along the log.

In another example, so-called "televiewer" logging apparatus (such as described in U.S. Pat. No. 3,502,169 granted to J. E. Chapman on Mar. 24, 1970 and copending application Ser. No. 827,799 also filed by J. E. Chapman on May 26, 1969) generates and displays data in such a manner that a picture of the wellbore wall is provided. This televiewer apparatus rotates a directional sonic transducer so as to continuously scan the circumference of a wellbore wall by alternately transmitting and receiving successive bursts of acoustic energy to provide the composite picture of the wellbore wall. To provide a directional reference, recurrent azimuthal signals are also transmitted to the surface of the earth as they occur, so that the resulting recorded log can be referenced to the azimuthal direction. The surface recording apparatus displays this information in a manner similar to that for displaying the sonic or acoustic logs.

Heretofore, therefore, the logs provided by the recording apparatus representative of various types of received sonic signals have been limited to sonic-$\Delta t$, waveform reproduction and variations of variable density desplays. Such logs have not been completely satisfactory as such logs are often very difficult to interpret.

Therefore, to provide well logs which lend themselves to easy interpretation, it is an object of this invention to provide new and unique methods and apparatus for providing acoustic and televiewer logs having an easily interpretable "three-dimensional" visual appearance which is pleasant to the eye.

Still another example of data which requires unusual methods and apparatus for the most advantageous display is that used for providing arrow-plots or vectors. Arrow-plot logs are presently used to provide information concerning: (1) the magnitude and direction of the inclination of a wellbore; and (2) the magnitude and direction of the dip or inclination of earth formations surrounding a wellbore relative to true vertical. It is of great practical importance to have information concerning the position and orientation of the wellbore along its length with respect to the starting point thereof on the earth's surface. This information is useful, for example, to insure that the borehole remains within a predetermined land area measured at the surface. It is also of great practical importance to have information concerning the position of subsurface earth formations in areas possibly containing or known to contain oil and gas bearing formations. This information is useful in that, among other things, it may aid in locating sizeable deposits of oil and gas trapped by faults or subsurface layers of slipped strata. It is also desirable since knowledge of subsurface faults or slipped strata may allow the oil field to be developed most efficiently. For example, the simple placement of wells can radically effect both the maximum rate of production and the ultimate recovery from a single oil reservoir.

Arrow-plot logs providing such information concerning the inclination of wellbores or formations have typically been provided manually from tabulated data. Although, in some instances the arrow-plots have been produced automatically by an "X" - "Y" plotter or a special purpose recorder. However, such methods have typically been time consuming and costly.

Therefore, it is another object of this invention to provide new and unique methods and apparatus for generating logs comprised of "arrows" or vectors representative of data corresponding to the magnitude and direction of the inclination of a wellbore or the magnitude and direction of the inclination of earth formations adjacent a wellbore.

With present logging techniques, it is likely that data from a multiplicity of downhole investigating devices of different types derived from one logging apparatus during one run or from multiple logging tools run at separate times might be combined for recording. In such cases, it may be desirable to present all of the different logs resulting from these various investigating devices on the same recording medium. However, if the combination of logs to be presented on one recording medium includes at least one of the so-called "standard" or amplitude versus depth logs such as sonic-$\Delta t$ or the like along with one of the "unusual" logs such as those produced by the methods and apparatus of this invention, some difficult problems arise. For example, if a CRT recorder is to be used it may be highly desirable that different sweep rates be used for the standard and unusual logs. In addition, if a single sweep of the CRT electron beam is used to produce both a standard and an unusual log such as a realtime recording of a sonic waveform, the recorder must be able to record the standard log without missing any traces and yet be ready to record the unsynchronized realtime waveform whenever it occurs. It is necessary, of course, to record the waveform whenever it occurs, unless extensive memory is provided, as the waveform will be lost and cannot be recovered. Therefore, it is a still further object of this invention to provide new and novel methods and apparatus for generating standard logs in combination with one or more of the unusual logs such as sonic waveforms, variable density, televiewer of "inclination" all on the same recording medium.

As was mentioned heretofore, it is not unusual that data from a multiplicity of downhole investigating devices be available for recording at the same time, and that it is often desirable that at least some of the data be combined and recorded on a single recording medium. However, the width of a recording medium is limited (typically, commercial logs are recorded on a medium approximately eight inches in width), and if there are a great number of different types of data that should be recorded at the same time, the amount of recording medium space available for each log or curve will be severely limited. Such space limitations normally adversely affect the ease of interpretation of a log and often also affect the resolution of the many curves on the log. For example, most of the unusual logs will require a large portion of a single recording medium (typically, half). Now, if there is also a large number of standard logs to be recorded, only the unused half of the recording medium is available for this large number of standard logs. This means that each of these standard logs may either be confined to a very small track on the single recording medium which will severely limit the resolution of the logs, or the logs will have a mid-point in a particular track and be allowed wide excursions into and across other tracks. Repeated, multiple and far-reaching excursions of logs into other tracks is often very confusing and makes the task of interpreting the data very difficult. Therefore, to provide excellent resolution of all the data needed to be recorded and at the same time still provide necessary side-by-side combination logs of that data where such side-by-side curves are preferred, it is desirable that more space on a recording medium be available for each of the logs or curves. Even when there is not a large number of different data to be recorded at the same time, it is not unusual that a particular log or portion of a log be of greater interest than the rest. If such interest is present, it might be advantageous that the log be recorded with an expanded depth scale, or that the data be allowed to range over a large portion of the available width of the recording medium to thereby provide greater resolution and ease of interpretation.

Therefore, to provide a greater area of recording medium available for each track or log to be recorded, one embodiment of the present invention includes at least two recording mediums operably arranged with a single CRT such that each recording medium records available data at substantially the same time.

SUMMARY OF THE INVENTION

The system of the present invention provides apparatus for recording various types of well logging data and comprises means for providing an energy beam which is directed by a first and second deflection means and beam intensity control means to selected locations on a recording means or surface sensitive to the energy beam. Typically, a CRT (cathode-ray tube) is used wherein the electron beam and screen of the CRT comprises the energy beam and recording means respectively. Means are also provided for generating a recurring or synchronizing signal or pulse representative of a recurring event such as the firing of a downhole acoustic transmitter, rotating a downhole device past magnetic North or transversing a particular depth interval with a downhole device. These recurring pulses which may be asynchronous (non-periodic) are used to initiate means coupled to one of the deflection means for sweeping the energy beam along one axis of the recording means. A downhole investigating device, a magnetic tape recorder or other means are provided for generating data or signals representative of the information to be recorded. These data signal are coupled to one or both deflection means and to the intensity control means and are used to modulate the intensity of the energy beam and simultaneously modulate the position of the energy beam along one or both axis of the recording means. If a temporary recording is sufficient, every trace or indicia produced on the recording medium by the sweeping energy beam is shifted or incremented in a direction perpendicular to the energy beam sweep thereby generating on the recording means (such as, for example, the screen of a CRT having a storage type screen) a composite of many traces in a stacked relationship. However, if a permanent recording is desired, the energy beam is not shifted after each sweep, but instead, a recording medium such as a photographic film located adjacent to the CRT screen is incrementally moved past the CRT screen in a direction perpendicular to the beam sweep such that each trace is recorded on the photographic film at spaced intervals in a stacked relationship.

In one embodiment of the recording apparatus discussed above, the data to be recorded are sonic waveforms received from the subsurface formations after a burst of sonic energy has been transmitted into the formations. The recording apparatus for this embodiment also includes means for interrupting the sweep of the energy beam and then using the received waveforms to modulate both the intensity and the vertical position of the energy beam simultaneously as the beam continues its sweep across the CRT screen to produce a trace with both its intensity and vertical position modulated with respect to the received sonic waveforms. When intensity and position modulated successive traces are produced on a recording means in a stacked relationship, a three-dimensional appearing log results.

In a second embodiment, data may be recorded as an arrow or vector by recording apparatus similar to that discussed above but which further includes new and improved circuitry which operates to interrupt or stop the sweeping energy beam at a selected position on the recording medium in response to one aspect of the data. This new circuitry also includes means for generating first and second sinusoidal signals each having an increasing amplitude. These two sinusoidal signals are similar in frequency and amplitude but are phase shifted from each other by 90°. These two amplitude increasing sinusoidal signals are then coupled to the two deflection means to sweep the energy beam in an increasing spiral pattern. Another data signal representative of the desired orientation of the vector is coupled to the intensity control means for unblanking the energy beam at the same angular position for each cycle of the increasing spiral pattern traveled by the beam thereby producing a series of indicia which appear as a vector.

Still in a third embodiment of the recording apparatus, the magnetic recording means or the investigating means for providing well logging data provides at least two types of data. A first control means responsive to one of the types of data is coupled to the intensity control means and deflection means and is used to modulate the intensity and position of the energy beam in a first part of the recording means as the energy beam sweeps across the recording means. The apparatus also includes means for interrupting the sweep of the energy beam at a selected location on the recording means, as well as means for switching the intensity control means and the deflection means between the first control means and a second control means which is responsive to the other type of data. The second control means is then used to modulate the intensity and position of the energy beam as the beam sweeps across the second portion of the recording medium.

The present invention also includes an embodiment which provides two recording mediums located adjacent two different areas or strips of the screen of a CRT used to provide indicia or traces. Means are included in this embodiment to shift the axis of selected energy beam sweeps such that certain sweeps produce indicia on one strip of the CRT screen and other sweeps produce indicia on the other strip of the CRT screen thereby providing two separate recordings while using only one CRT.

BRIEF DESCRIPTION OF THE DRAWINGS

FIG. 6 shows a combination acoustic logging device and a sonic-$\Delta t$ logging device in a single tool along with apparatus for providing recordings derived from data produced by both devices in accordance with still another embodiment of the present invention;

FIG. 7 is a circuit diagram of one of the components of FIG. 6;

FIG. 8 is representative of typical signal variations along a 6-foot interval in a typical wellbore;

FIG. 9 is representative of the recording of the signal variations of FIG. 8 provided by the apparatus of FIG. 6;

FIGS. 10A – 10J and 11A – 11L graphically represent voltage waveforms at various points in the circuitry of the apparatus of FIG. 6;

FIG. 12 shows circuitry used in an alternate embodiment of FIG. 6;

FIG. 22 graphically represents the generation of a lissajous pattern on a CRT;

FIG. 23 graphically represents the generation of a spiral pattern on a CRT;

FIG. 24 illustrates a compass-rose divided into 24 segments of 15° each;

FIG. 25 represents a vector generated by the circuitry of FIG. 14;

FIGS. 26a–b represent the voltage waveforms applied to the horizontal and vertical drive circuits of a CRT to generate the vector of FIG. 25;

FIG. 28 illustrates scale lines on a recording as generated by the apparatus of FIG. 27;

FIG. 29 shows segments of the scale lines illustrated in FIG. 28 produced during one sweep of the CRT electron beam of the apparatus of FIG. 27.

DETAILED DESCRIPTION OF THE INVENTION

Figure 1:
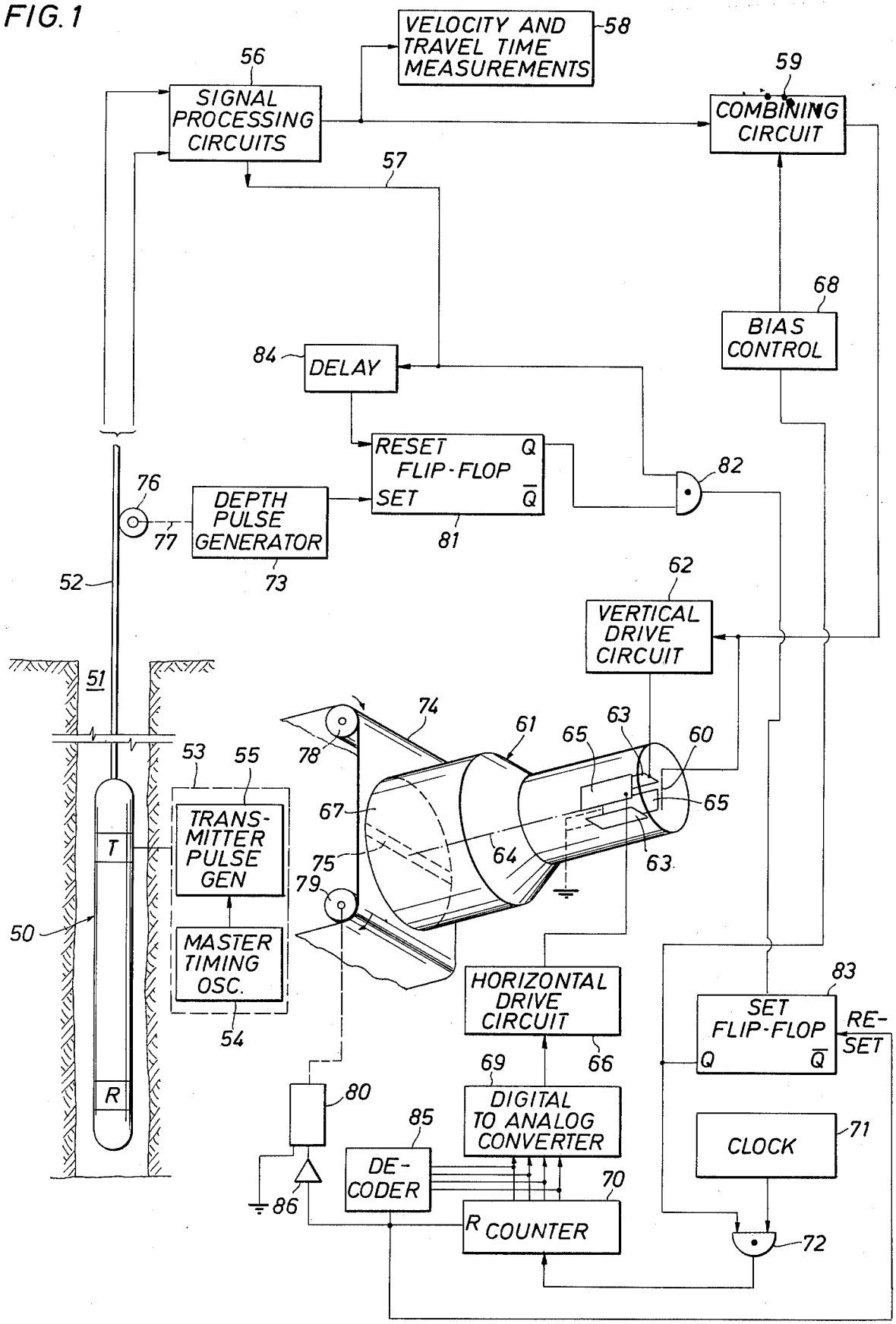
FIG. 1 shows a typical acoustic logging tool in a wellbore along with apparatus for recording signals derived from the logging tool in accordance with one embodiment of the present invention.

Now referring to FIG. 1, there is shown apparatus for producing and recording well logging signals in such a manner so as to provide a log having a three-dimensional effect in accordance with one aspect of this invention. A typical downhole investigating tool 50 for investigating earth formations traversed by a wellbore 51 is supported in the wellbore by a typical multiconductor logging cable 52 which is raised and lowered by a typical winch (not shown).

The tool 50 in the present embodiment is illustrated as a typical sonic logging tool having at least one transmitter T for periodically emitting bursts of acoustic energy and one or more receivers, as at R, spaced at suitable intervals from the transmitter for receiving the acoustic energy reflected from the earth formations. Firing pulse timing circuitry 53 for providing a firing pulse to the transmitter T within tool 50 comprises a master timing oscillator 54 having a substantially constant frequency which provides timing signals to transmitter pulse generator 55. generator 55 in turn supplies the firing pulses to transmitter T. This pulse timing circuitry 53 is in reality contained within tool 50 but is shown outside thereof for purposes of clarity. It should be noted that even though master timing oscillator 54 and transmitter pulse generator 55 are illustrated as part of the downhole well tool 50, it is often desirable that these items be located within the surface apparatus. A detailed explanation of suitable downhole circuitry for providing firing pulses to the transmitter T and synchronized timing pulses $T_o$ to the earth's surface may be found in U.S. Pat. No. 3,590,940 granted to G. L. Legar on July 6, 1971. The signals received by receiver R as well as timing signals $T_o$ which are coorelated with the firing of transmitter T are returned to the surface of the earth through cable 52 through utilization of suitable downhole circuitry (not shown) to suitable signal processing circuits 56. Signal processing circuits 56 are effective to extract the necessary information and process it such that it is available for recording and any other desired uses. For example, the timing pulse $T_o$ is detected by circuits 56 which then generate a synchronization pulse or signal for the surface apparatus representative of the timing signal $T_o$. This synchronization pulse is provided to the other surface apparatus by way of conductor 57. How this synchronization pulse is used by the apparatus of this circuit will be described in detail hereinafter. In addition, the extracted information may also be applied to velocity and travel time measurement circuits 58. Other arrangements of the tool 50 can, of course, be used with the recording methods and apparatus of the present invention. It should be understood, at this point, that although this invention is described with respect to on-line downhole apparatus, the information derived from the downhole apparatus could be recorded on a storage medium such as magnetic tapes, magnetic disks or the like and later played back and recorded for visual observation by the methods and apparatus of this invention.

The signals from signal processing circuits 56, representative of the received acoustic waveforms, are applied to a combining circuit 59 whose output is connected to the energy or electron beam intensity control grid 60 of a CRT (cathode-ray tube) 61. In addition to being connected to the intensity control grid 60 of CRT 61, it is of particular significance to note that in this embodiment of the invention the output of combining circuit 59 is also applied to a vertical directing or drive circuit 62 for applying a signal representative of the output of combining circuit 59 to the vertical deflection means such as the vertical deflection plates 63 of CRT 61. It should be understood, of course, that the electron beam deflection means could also comprise magnetic coils. In addition, as will be explained hereinafter, the electron beam 64 of CRT 61 is swept horizontally across the screen by means of horizontal deflection plates 65 connected to a horizontal directing or drive circuit 66.

To provide a proper bias level for electron beam 64 as it travels across CRT screen 67, the recording apparatus of the present invention further includes bias control circuit 68 which is arranged to normally inhibit a visible image being produced on CRT screen 67. Then, to record a trace, bias control circuit 68 cooperates to supply a bias signal of a selected magnitude to combining circuit 59. This recording bias level is desirably set so that a medium intensity trace will be produced at approximately the mid-point of screen 67 when the data signal input is zero. Therefore, if a received input signal has both positive and negative portions, the positive portions of the signal will result in a darker or more intense and positively displaced trace being recorded; and the negative portions will result in a less intense and negatively displaced trace being recorded. Bias control circuit 68 could, for example, be as switching arrangement, such as semi-conductor switches, a relay or the like which normally supplies a negative voltage to combining circuit 59 but, which when energized, supplies proper positive bias voltage to the combining circuit. To provide the horizontal sweep of the electron beam 64 across the CRT screen 67, the input voltage applied to horizontal drive circuit 66 is a saw-tooth or ramp voltage generated by a D/A (Digital to Analog) converter 69 in response to the digital output of counter 70. The pulse input to counter 70 is supplied from clock source 71 by means of AND gate 72. As will be discussed later, AND gate 72 is arranged to pass the clock pulses only in response to a signal provided by combining a synchronization pulse from the signal processing circuits 56 and a depth pulse which is representative of tool 50 moving a precise interval through wellbore 51 and which is generated from depth pulse generator 73.

Figure 2:
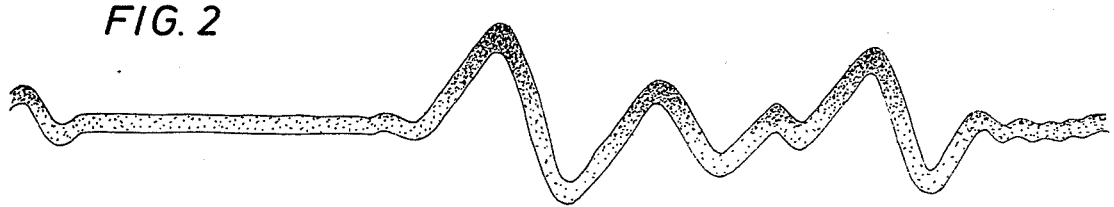
FIG. 2 schematically illustrates a typical single trace representative of a well logging signal having both intensity and position modulation as may be produced by the apparatus of FIG. 1.

Thus, in accordance with this embodiment of the present invention, as the electron beam 64 of CRT 61 is swept horizontally across the CRT screen 67 which screen is, of course, sensitive to the electron beam, a trace or indicia will be produced on CRT screen 67 which varies both in intensity and in vertical position in response to the combined signal from combining circuit 59. FIG. 2 illustrates a typical single trace produced on CRT screen 67 by the apparatus of this invention. In this illustrative example, the trace is shown having very dark or high-intensity positive peaks which intensity decreases as the vertical position of the trace representative of the signal amplitude decreases to produce negative peaks.

In order to produce a permanent record of the successive intensity and position modulated sweeps of the CRT beam 64 a movable recording medium 74 is provided for recording the successive transverse traces formed on CRT screen 67. In the preferred embodiment of the present invention, screen 67 of CRT 61 is provided with a strip of fiber optics 75. Such fabrication of the screen 67 allows high resolution and eliminates the need of a complicated lens system. Recording medium 74 is passed in close proximity to fiber optic strip 75 so that the traces or indicia appearing on CRT screen 67 will be successively recorded by recording medium 74. Typically, the rate of movement of recording medium 74 past fiber optic strip 75 varies with the rate of movement of tool 50 in the wellbore.

Such correlation between the rate of movement of the recording medium 74 and the rate of movement of the well tool 50 is desirable since, if the recording medium 74 were simply driven at a constant speed, a decreased travel speed of the logging tool 50 would result in an increase in the number of data traces per unit length of the recording medium; and conversely, a decreasing number of data traces per unit length would occur at faster travel speeds of tool 50. Therefore, the new and improved circuitry shown in FIG. 1 provides for a constant number of data traces per unit length of the recording medium as is also shown in the heretofore mentioned Tanguy patent (No. 3,488,661) and copending Elliott application Ser. No. 15,790. This is accomplished by recording well logging data from selected intervals of depth at uniform spacings along the length of the moving recording medium. To control the placement of the traces on recording medium 74, a typical measuring wheel 76 is operatively engaged with cable 52 for rotating shaft 77 as a function of the movement of cable 52 and, thus, the depth of the tool 50 in the wellbore 51. Shaft 77 is coupled to depth pulse generator 73 for generating pulses as given incremental lengths of cable 52 pass measuring wheel 76. The pulses from depth pulse generator 73 are then combined with the synchronizing pulses from signal processing circuits 56 by the apparatus to be discussed hereinafter in such a manner that recording medium 74 is advanced past CRT screen 67 from supply reel 78 to take-up reel 79 by means of stepping motor 80, at a rate which varies with the rate of movement of logging tool 50 through the wellbore 51.

Accordingly, it will be appreciated that the advancement of the recording medium 74 by stepping motor 80 is effective for longitudinally displacing each successive trace which trace is representative of data produced from preselected depth intervals produced by the transverse sweep of beam 64 a small and precise distance from the preceding trace. In addition, as will be discussed later, the successive traces are produced in a stacked relationship on recording medium 74 with the starting point of each trace being representative of the firing pulse and being aligned along the length of the recording medium. As previously described, each trace varies in accordance with variations in the amplitude of the data signal in both density and vertical position as it passes across the width of recording medium 74. As a result, when the successive traces are recorded according to this embodiment of the present invention, a representation of the sonic signals is produced which has an unusual three-dimensional appearance.

Circuitry suitable for providing necessary synchronization must, of course, be provided between the horizontal sweep of the electron beam 64, the received sonic signals and depth pulses. To accomplish this, the pulses from depth pulse generator 73 set flip-flop 81 whose "Q" output energizes AND gate 82. The synchronizing pulse from signal processing circuits 56 is then supplied by way of AND gate 82 to the set input of flip-flop 83. The synchronizing pulse from signal processing circuits 56 which set flip-flop 83 also resets flip-flop 81 after a suitable delay by a delay circuit 84. This delay is selected so as to eliminate a race between the arrival of the pulse at the "set" input of flip-flop 83 and at the "reset" input of flip-flop 81. Thus, the delay circuit 84 insures that flip-flop 83 will be energized at the appropriate time. The Q output from flip-flop 83 energizes the bias control circuitry 68 which as was discussed heretofore, preferably serves to bias the electron beam 64 to a mid-screen position (on the vertical axis) and at a medium intensity level in preparation for each horizontal sweep of the electron beam 64 across CRT screen 67. In addition to energizing bias control circuitry 68, the output of flip-flop 83 also provides the necessary signal to enable AND gate 72 to pass the clock pulses from clock 71 to counter 70. When the necessary number of clock pulses for sweeping the electron beam 64 completely across the screen 67 have been provided from clock 71, decoder 85 will generate a pulse output signal which is applied to the reset inputs of counter 70 and flip-flop 83 respectively. The reset signal resets the binary digital output of counter 70 to zero and changes the Q output of flip-flop 83 from a "1" to a "0", so that no further clock pulses can be passed to counter 70 through AND gate 72. The reset signal from decoder 85 is also amplified by power amplifier 86 for driving the recording medium stepping motor in the manner heretofore described. Since flip-flop 81 is set only at equal depth intervals; bias control circuit 68, stepping motor 80, and horizontal drive circuitry 66 can operate only at the selected depth intervals. It can be seen, therefore, that successive traces will be recorded on recording medium 74 at equal spacings which traces are representative of data at equal intervals of depth.

Figure 3A:
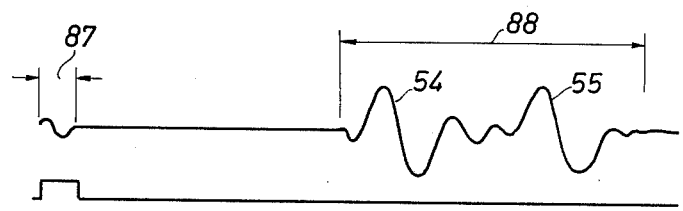
FIGS. 3A – 3E graphically represent operation of the recording apparatus of FIG. 1.
Figure 3B:
Figure 3C:
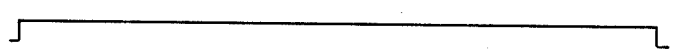
Figure 3D:
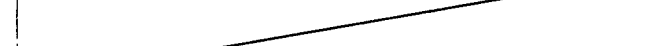
Figure 3E:
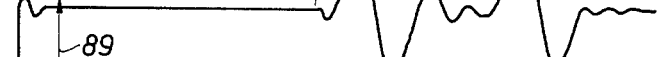

Referring now to FIGS. 3A – 3E, the operation of components of the apparatus shown in FIG. 1 is graphically displayed. FIG. 3A shows an example of the signals produced by the signal processing circuits 56 of FIG. 1. Portion 87 of the illustrated signal is representative of one of the timing pulses $T_o$, and portion 88 of the illustrated signal is representative of one of the received sonic signals picked up by receiver R in tool 50. FIG. 3B is representative of the synchronization pulse provided by signal processing circuits 56 on conductor 57 in response to the timing pulse $T_o$. FIG. 3C shows the output waveform of flip-flop 83 which causes the bias control circuit 68 to bias the electron beam 64 of CRT 61 to the proper voltage level for producing a trace on the CRT screen 67. The pulse shown in FIG. 3C is also, of course, representative of the time period AND gate 72 passes clock pulses to counter 70 which in turn provides a digital binary signal to D/A converter 69. Referring now to FIG. 3D, there is shown a plot of the horizontal position of the electron beam 64 as a function of time for a single sweep. FIG. 3D is also representative of the output of D/A converter 69. In addition, since the electron beam 64 moves across screen 67 of CRT 61 at a constant velocity, the time or horizontal axis of FIG. 3D can also be considered to be the width of the CRT screen 67. FIG. 3E is representative of the actual signal applied to the intensity and vertical drive circuitry of CRT 61 from combining circuit 59. Portion 89 of the signal shown in FIG. 3E depicts the rise of the signal in response to the bias voltage applied to the combining circuit 59 from bias control circuit 68 when flip-flop 83 is set. Portion 90 of the waveform shown in FIG. 3E depicts the subsequent modulation of the signal as it varies in response to the received sonic signal. It can be seen, therefore, that both the vertical position of the electron beam 64 and the intensity of electron beam 64 will vary in response to the signal as shown in FIG. 3E.

It is to be understood that the above embodiment was described with regard to the use of a recording medium moving past the CRT screen for purposes of providing a permanent record. If, however, a permanent recording is not necessary, a temporary recording may be provided by the apparatus of this invention by using a CRT having a storage screen. With such apparatus the first sweep would start, for example, at the lower left-hand corner of the screen and sweep across. Each successive sweep would be incremental toward the top of the screen a predetermined increment and would represent a new depth of the well logging tool. After the screen is filled, the screen would be erased and the process would then be repeated.

Figure 4:
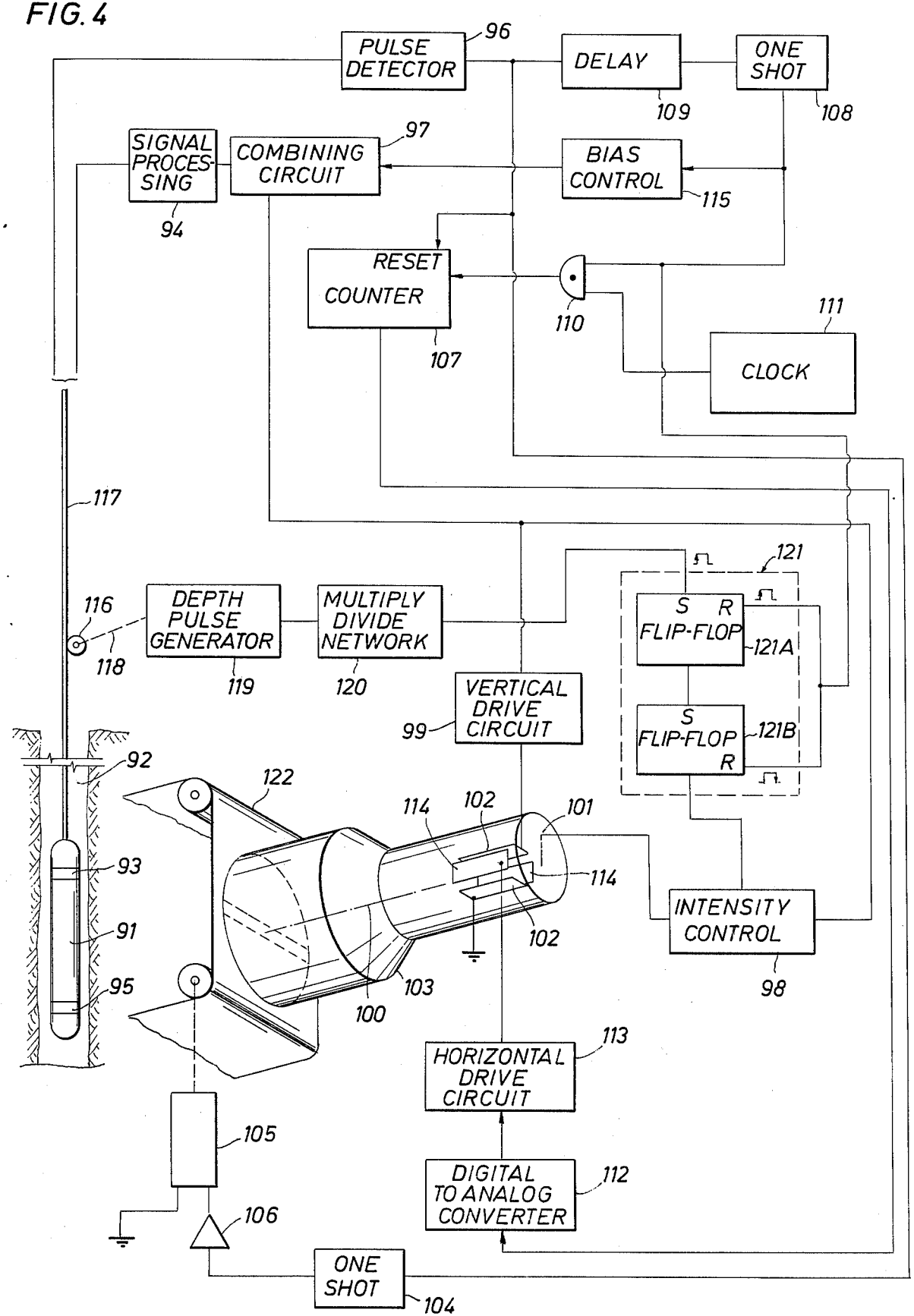
FIG. 4 shows a typical wellbore televiewer tool along with apparatus for recording signals derived from the televiewer tool in accordance with another embodiment of the present invention.

Now concerning the televiewer investigating apparatus, there is shown in FIG. 4 typical sonic downhole televiewer apparatus 91 for scanning the wall of the wellbore 92. A detailed description of downhole apparatus, as well as complex synchronization circuits found in surface apparatus suitable for use with the present invention is included in U.S. Pat. No. 3,502,169 and copending application, Ser. No. 827,799 both filed in the name of J. E. Chapman and heretofore mentioned. However, to aid in understanding how the present invention works in combination with such apparatus, a very brief summary of the televiewer apparatus is included herein. The downhole apparatus 91 is arranged for periodically energizing an acoustic transducer 93 which rotates around the vertical axis of the wellbore as the apparatus 91 moves through wellbore 92. The acoustical signal resulting therefrom is reflected from the wall of the wellbore back to the transducer 93 where it is detected. The detected or received signals and a pulse representative of the acoustic transducer firing is supplied to processing circuits 94 located at the surface of the earth. The downhole apparatus 91 also includes a north azimuthal detector 95 for supplying a recurring pulse to pulse detector 96 located at the surface of the earth each time rotating transducer 93 passes magnetic North.

After processing by processing circuits 94 to assure that noise is not detected as a received signal, and to modify the received signals as necessary to make them compatible with the surface equipment comprising this invention, the received signals are applied to a combining circuit 97 where a selected constant bias voltage is combined with the received signals. The output from combining circuit 97 is then supplied to an intensity control circuitry 98 and a vertical drive circuitry 99 for providing both intensity and position modulation of the CRT electron beam 100 by modulating the input signal to control grid 101 and vertical plates 102 of CRT 103.

Therefore, it will be appreciated that the sweep of the CRT electron beam 100 should be synchronized with the rotation of the downhole transducer 93. This synchronization is provided by use of the recurring azimuth pulses which are generated by the north azimuthal detector 95 each time the downhole transducer 93 is pointed toward magnetic North and are supplied to pulse detector 96. The pulse detector 96 typically includes a discriminating amplifier which is responsive to only the azimuth pulses for eliminating noise, and a suitable waveshaping circuit, such as a Schmitt trigger, for squaring up the azimuth pulses received at the surface of the earth.

Azimuth pulses from pulse detector 96 are applied to one-shot 104 which in turn provides a pulse output to stepping motor 105 by way of power amplifier 106 to incrementally move the recording medium for each successive trace. The recurring azimuth pulses representative of North are also applied to the reset input of counter 107 such that the output of the counter is reset to zero. Further description of counter 107 and its operation for providing the horizontal sweep of electron beam 100 of CRT 103 will be set out hereinafter.

Figure 5A:
FIGS 5A – 5D graphically represent voltage waveforms at various points in the circuitry of the apparatus of FIG. 4.
Figure 5B:
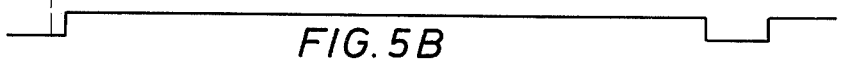
Figure 5C:
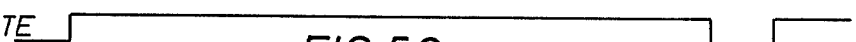

For purposes of better appreciating the time relationship between the azimuth pulse and operation of the remaining circuit, refer to FIGS. 5A – 5D. Azimuth pulses, as shown in FIG. 5A, are also used to trigger one-shot 108 after a suitable short delay by delay circuitry 109. The delay provided by delay circuitry 109 is to insure that counter 107 will be reset to zero prior to one-shot 108 providing an output to AND gate 110, and is preferably set for the minimum possible delay time. The delayed output pulse from one-shot 108 shown in FIG. 5B may be related to the recurring azimuth pulses by comparing FIGS. 5A and 5B. The output of one-shot 108 is applied to AND gate 110 and allows AND gate 110 to pass clock pulses from a clock source 111 to counter 107. FIG. 5C shows the time period that gate 110 passes clock pulses to counter 107. Counter 107 then works in conjunction with D/A converter 112 and horizontal drive circuit 113 to provide horizontal drive to the CRT electron beam 100 in the same manner described above with respect to FIG. 1.

Figure 5D:

It should be noted at this point, however, that to insure a substantially complete display of the scanned wall of the wellbore 92, the time necessary for a complete sweep of electron beam 100 across the screen of CRT 103 is selected to be slightly greater than the expected time between the recurring azimuth pulses. This means, of course, that the time necessary for a complete sweep of electron beam 100 across the CRT screen is slightly greater than the expected time for the downhole transducer 93 to make a complete scan of the wall of the wellbore 92. FIG. 5D shows the analog ramp signal produced by D/A converter 112 in response to the output of counter 107. The output of D/A converter 112 is applied to horizontal drive circuit 113 which in turn furnishes the control signals applied to horizontal plates 114 of CRT 103. The dashed line attached to the ramp signal of FIG. 5D illustrates the additional signal that might be needed to provide full sweep of the beam across the screen of CRT 103. It should be recalled from the earlier discussed embodiment that the time axis of FIG. 5D may be considered to be the width of the CRT screen.

The output of one-shot 108 is also applied to bias control circuit 115 so that the necessary bias level may be combined with the received signal pulse for the desired display on the CRT screen. In the above described technique for synchronizing azimuth position with the CRT beam sweep, a substantially complete display of the wall of the wellbore 92 can be recorded. There is, however, a very small section of the wall of the wellbore that will not be displayed during each scan due to the built-in delay by delay circuit 109 which is necessary for accomplishing beam retrace, record advance, etc. Appropriate modification could, of course, be made to achieve a full display.

The new and improved apparatus of the invention further includes a measuring wheel 116 disposed adjacent to cable 117 so as to rotate shaft 118 as a function of vertical movement of the televiewer apparatus in the wellbore 92. Shaft 118 is connected to depth pulse generator 119 for generating pulses at selected intervals of cable movement. Depth pulse generator 119 provides pulses representative of a predetermined vertical distance being traversed by the televiewer apparatus 91. These pulses may, of course, either be used directly; or the pulses may be multiplied or divided as necessary by network 120 such that network 120 provides pulses, hereinafter referred to as "interval pulse", at a rate representative of the depth intervals desired to be recorded. The interval pulses are then synchronized with the beam sweep of CRT 103 by synchronization circuit 121 before being applied to intensity control circuit 98 for selectively regulating the intensity of the trace which beam sweep occurs substantially during the interval pulse. As shown by synchronization circuit 121, suitable synchronization may be accomplished with two flip-flops, 121A and 121B. Flip-flop 121A is set on the "leading" edge of the interval pulse and reset on the leading edge of the pulse from one-shot 108 which, of course, occurs during a beam sweep. Flip-flop 121B, however, is set on the "trailing" edge of the pulse from flip-flop 121A and reset on the trailing edge of the pulse from one-shot 108. Therefore, it can be seen that the simultaneous occurrence of an interval pulse and a pulse from one-shot 108 results in a single pulse from flip-flop 121B which is coincidental with the very next pulse from one-shot 108. The output of flip-flop 121B is then applied to intensity control circuit 98. The beam intensity can, for example, be biased so low by each depth interval pulse that no trace is visible during the depth interval pulse. Alternately, the beam intensity could be biased to such a high level that a very dark line is produced on the CRT screen during the depth interval pulse. Thus, there could be lines across the recording medium representative of the televiewer apparatus moving a precise interval through the wellbore thereby providing the highly desirable correlation between depth and recorded data.

Thus, it can be seen from the foregoing that the scanning frequency of the downhole apparatus and the CRT beam sweep frequency may be correlated with the movement of the televiewer apparatus 91 through wellbore 92. Since the downhole transmitter is fired a great many times per scan or revolution around the wellbore 92, the data signal applied to the intensity and vertical drive circuitry for each sweep of the CRT electron beam will be representative of the signals received during such a scan or revolution. Thus, as the received signals vary in magnitude, the intensity and vertical position of the CRT electron beam will vary accordingly. The length of the recording medium 122 is, of course, referenced to depth and the width is referenced to azimuthal direction, i.e., north, east, etc. Thus, it can be seen that a continuous log of the circumferential investigation of the wellbore 92 is provided.

It can therefore be seen that with the new and improved apparatus of this embodiment of the present invention, a relatively simple and inexpensive means has been provided for recording in a three-dimensional appearing form measurements obtained from a borehole scanning type of wellbore investigating apparatus such as the televiewer apparatus.

As was the case with the sonic waveform logging embodiment, the above-described embodiment was described with regard to a recording medium for providing a permanent record. Also, as with the sonic waveform logging embodiment and as was discussed heretofore, a temporary recording may be provided by this embodiment by using a CRT having a storage type screen and indexing each sweep of the CRT beam to a new vertical position.

In each of the embodiments discussed above, it has been assumed that the full sweep of the CRT beam across the screen is available for displaying signals received from the sonic transducer. However, with present logging techniques, it is likely that a multiplicity of downhole investigating devices of different types, including sonic or borehole televiewer, might be combined in a single logging tool. In fact, sonic investigating devices are presently combined with a number of other investigating devices in commercial operation. In such cases, it would be desirable to present all of the different logs resulting from these various investigating devices on the same recording medium. Copending application Ser. No. 15,790, filed by J. W. Elliott and heretofore mentioned describes in detail how a multiplicity of standard logs may be recorded by a single CRT recorder. Each of these logs is recorded as a single trace having a position on the recording medium which is a function of the amplitude of the signal to be recorded. To provide a combination of one or more standard logs of the type produced with a recorder of the type described in the Elliott application with one or more of the unusual type logs such as sonic waveforms, variable density or televiewer, it may be desirable that different portions of the recording medium be allotted for the various types of logs.

Figure 6:
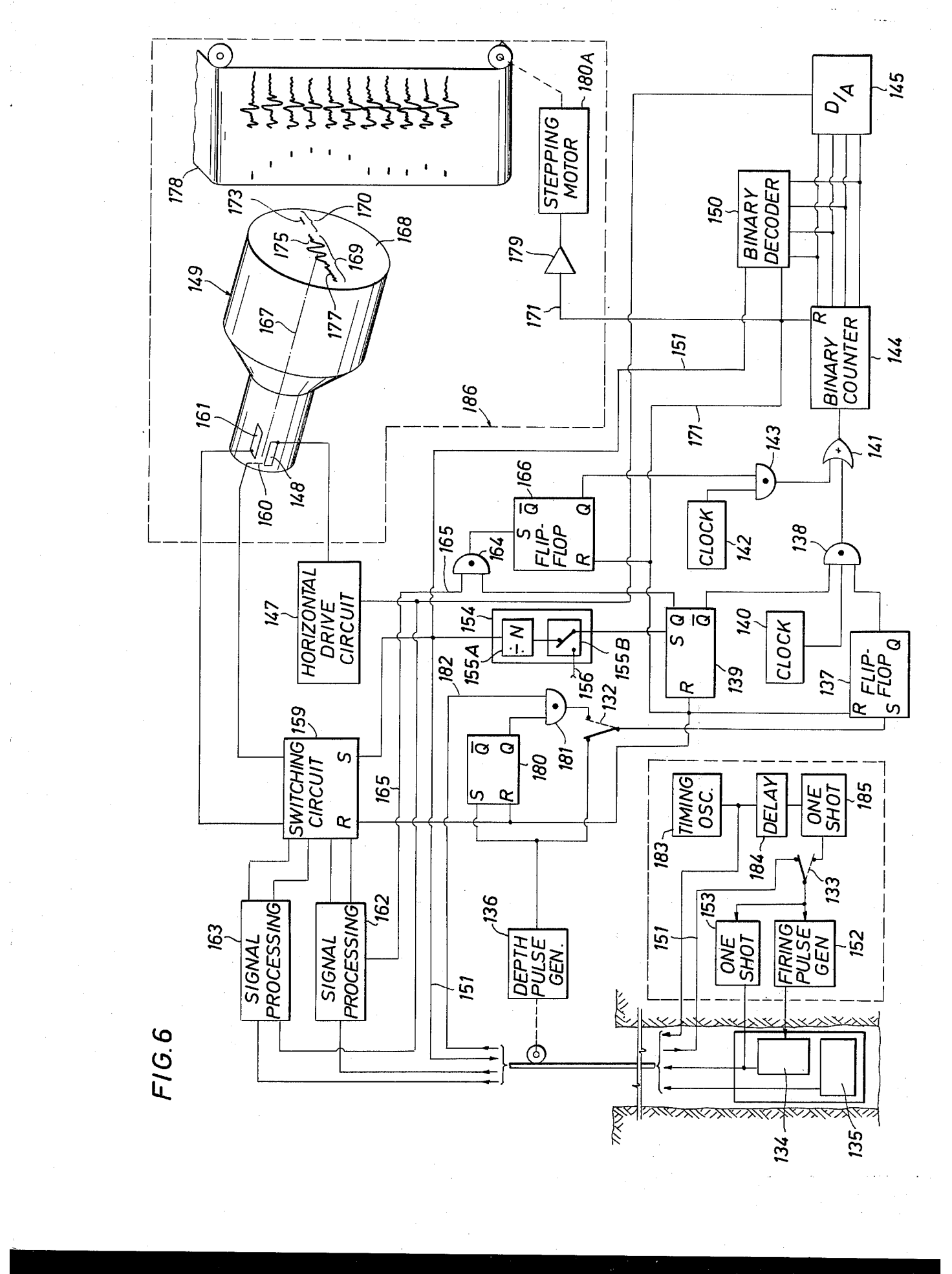

If a sonic travel time, $\Delta t$, log, for example, is to be produced by the methods and apparatus taught in the Elliott application in combination with a three-dimensional sonic waveform log produced by the method and apparatus heretofore described, presentation of the sonic-$\Delta t$ log could be on the first portion of the CRT screen and the three-dimensional log could be presented on another portion of the CRT screen. It will be appreciated, of course, that although the following example is limited to a standard sonic-$\Delta t$ and an unusual three-dimensional sonic waveform log, any number of standard log and any other unusual log such as variable density, sonic waveform or televiewer could be combined by a similar circuit. Referring now to FIG. 6, there is shown circuitry according to the teachings of this invention for providing such combination logs. As will be described in detail hereinafter, the circuitry of this embodiment provides that as the electron beam sweeps over the first portion of the screen at a first speed, the sonic-Δt log is recorded in a manner similar to that described in the heretofore mentioned Elliott copending application; then, at a preselected location along the horizontal sweep, the sweep of the electron beam across the screen is interrupted and after a short delay, the electron beam begins sweeping again at a different rate (in this example the rate is substantially increased, but the rate change could even be decreased) so that the high frequency sonic waveform signal can be recorded on the second portion of the screen.

Before beginning the detailed discussion of this combination circuitry of FIG. 6, it might be desirable at this point to briefly discuss the operation of the circuitry for providing a standard log such as sonic-Δt.

It is to be understood that the following description of how standard well logging data (such as sonic-Δt) could be recorded is explanatory only and is considered to comprise a part of the present invention only as it pertains to methods and apparatus that are suitable for combination with other inventive features of this invention. Typically, as the electron beam is swept along the horizontal axis of the CRT screen, it is turned on for a short interval at a point along the horizontal axis representative of the magnitude of the data. Referring now to FIG. 7, there is shown a typical circuit for controlling the electron beam of a CRT for recording amplitude versus depth or standard logs such as might comprise the signal processing circuits 163 in the embodiment shown in FIG. 6 of the present invention. Combining circuit 123 receives the analog sonic-Δt signal (or whatever data is desired to be recorded) from the sonic-Δt downhole investigating device and a specific DC biasing voltage from biasing circuit 124. The two signals are then combined by combining circuit 123 and provide an output to comparator 125, which output comprises a signal with a DC component equal to the output of the biasing circuit 124 and a variable component equal to the sonic-Δt data signal. Thus, the signal applied to comparator 125 varies around the DC biasing level (positive or negative) according to variations in the sonic-Δt data signal. Comparator 125 also receives a constantly increasing ramp signal which is representative of the signal used to drive the electron beam of the CRT in a horizontal direction. Thus, it can be seen that when the ramp signal from the horizontal drive circuit increases to a level such that it is equal to the signal from combining circuit 123 applied to the other input of comparator 125, the comparator circuit 125 will provide a constant level output. This output signal from comparator 125 is then applied to one-shot 126 which in turn provides a short output pulse to the intensity control grid of the CRT. By referring to FIGS. 8 and 9 in conjunction with the following discussion the operation of this circuit may be more clearly understood. Assume that the sonic-Δt data signal 127 varies around the zero level 128 for a particular 6-foot wellbore interval as shown in FIG. 8, and that a depth pulse generator is triggered every 6 inches as represented by the depth lines 129 dividing the data signal 127 into 12 equal parts. Also assume that the horizontal sweep of the CRT electron beam is synchronized with the 6-inch depth pulses from the depth pulse generator. Therefore, it can be seen that for the 6-foot depth interval shown, discrete values of the sonic-Δt data will be similar to those values of the signal 127 where the corresponding depth lines cross the data curve. Consequently, since comparator 125 only generates a signal when its two inputs are equal, and since one of the two inputs is a ramp signal corresponding to the horizontal drive signal, the horizontal location of the electron beam when it is turned on by the output of one-shot 126 will correspond to the magnitude of the data signal 127 at a particular depth. Thus, during each sweep of the electron beam, a small dash is generated on the recording medium, and the horizontal location of that dash on the recording medium corresponds to the sonic-Δt data value at that depth. FIG. 9 is illustrative of a log produced by a series of dashes as representative of data produced at the same depth interval covered by FIG. 8. Dashed line 130 of FIG. 9 is representative of the DC bias value and is considered the zero value. Curve 131 shows how the sonic-Δt data can vary on both sides of the bias value. As was mentioned heretofore, a discussion of a unique and very superior recorder particularly suited for combining with the present invention is contained in the copending Elliott application.

Referring again to FIG. 6, there is shown a complete block diagram of another embodiment of this invention comprising circuitry suitable for accomplishing combination logs such as sonic-Δt logs and the unique three-dimensional logs heretofore described. FIGS. 10A – 10J are representative of signal outputs of different components of FIG. 6 when FIG. 6 is operating in a first mode. In this first mode of operation, switches 132 and 133 of FIG. 6 are assumed to be in the position illustrated. In a second mode to be discussed hereinafter, these switches will be in the position illustrated by the dashed lines. Referring now to FIG. 6 in conjunction with FIG. 10, a well tool contains a sonic investigating device 134, and if desired other devices such as a gamma-ray investigating device 135. In the manner heretofore described with respect to the embodiment, the well tool 134 is moved through the wellbore by a multiconductor cable and an incremental indication of the movement of well tool through the wellbore provided by depth pulse generator 136. The pulses generated by depth pulse generator 136 are applied by way of switch 132 to the set input of flip-flop 137. FIG. 10A is representative of the pulse output from depth pulse generator 136. When a flip-flop 137 receives the pulse from depth pulse generator 136, the Q output a flip-flop 137 changes from a 0 to a 1 as is represented by the curve shown in FIG. 10B. This 1 signal from the Q output of flip-flop 137 is applied to one of the three inputs of AND gate 138. One of the remaining inputs to AND gate 138 is from the Q̄ output of flip-flop 139, and as will become clear hereinafter, flip-flop 139 will be in the reset condition at this time; and therefore, the Q̄ output is supplying a continuous 1 to AND gate 138. The other input to AND gate 138 is from a first clock source 140. Thus, it can be seen that AND gate 138 will be supplying a pulse output of the type generated by clock source 140 to OR gate 141. The second input to OR gate 141 is also from a clock source. Application of this second clock source 142 to OR gate 141 is controlled by AND gate 143 and will be discussed hereinafter. It is assumed in this embodiment that clock source 140 operates at half the pulse rate of clock source 142, although it should be understood that clock source 140 could be chosen to produce a clock pulse rate even faster than the rate from clock 142. FIGS. 10C and 10D are representative of the pulse outputs from clock source 140 and clock source 142 respectively; and FIG. 10E, as will be further explained hereinafter, is representative of the output from OR gate 141. This pulsating clock source from OR gate 141 is applied to the input of binary counter 144 which counts the pulses and supplies a binary output on four lines representative of the number of pulses counted. This binary representation of the counted pulses is applied to the input of D/A (digital to analog) converter 145 such that the D/A converter generates an output ramp signal similar to that shown at portion 146 of FIG. 10F. The ramp signal from D/A converter 145 is then applied to horizontal drive circuit 147 which in turn provides the drive signal to the horizontal drive plates 148 of CRT 149. The ramp signal from D/A converter 145 is also the same ramp signal applied to comparator 125 illustrated in FIG. 7 and heretofore discussed. The binary output of counter 144 in addition to being applied to D/A converter 145 is also applied to binary decoder 150. Therefore, when a preselected number of pulses have been applied to binary counter 144, binary decoder 150 will decode this number and provide a pulse output on line 151. FIG. 10G is representative of the pulse from decoder 150 on line 151. This pulse from decoder 150 is applied to the downhole transmitter pulse generator 152 and one-shot 153 by way of switch 133. Although transmitter pulse generator 152, one-shot 153 and switch 133 are shown as parts of the downhole well tool in the described embodiment, it should be understood that these items could instead be located in the surface equipment. Thus, a sonic pulse will be transmitted into the formations when the transmitter contained in investigating device 134 fires as a result of this pulse from transmitter pulse generator 152. In addition, a timing pulse $T_o$ from one-shot 153 will be coupled onto and transmitted back to the surface of the earth where it will be detected and used as a synchronizing pulse or signal to synchronize the surface apparatus. At the surface, the output pulse on line 151 from binary decoder 150 will also be applied to selection circuit 154. Selection circuit 154 will typically include a "divide-by-N" circuit 155A and a switch 155B which can switch between the divide-by-N circuit 155A and an external input on conductor 156. The use of divide-by-N circuit 155A means that a pulse on line 151 is gated through selection circuit 154 to the set input of flip-flop 139 only once for every N pulse if the switch 155B is in the position illustrated, or in response to the external input on conductor 156 if switch 155B is in the dashed position. Therefore, as will become clear hereinafter, if N is set to one, the recorder would record a waveform for every sweep of the CRT electron beam. On the other hand, if N is set to 5, 10 or 15 or any other number, a waveform would be recorded only every 5th, 10th, 15th, etc. sweep of the electron beam. Of course, if switch 155B is opened (moved to the dashed position), then the recorder would never record a waveform except in response to an external signal. In the following example, switch 155B is assumed to be in the position as shown and is assumed to be set to one so that a waveform is recorded during every sweep of the CRT electron beam. Now applying a pulse to the set input of flip-flop 139 changes the $\bar{Q}$ output of the flip-flop from a continuous 1 to a continuous 0. Therefore, when flip-flop 139 is set, AND gate 138 will stop providing clock pulses to OR gate 141, and the ramp output of D/A 145 will change to a steady state value. Portion 157 of FIG. 10E and portion 158 of FIG. 10F are illustrative of the outputs of OR gate 141 and D/A 145 respectively during this waiting period. The pulse output of decoder 150 is also used to switch switching circuitry 159 such that the signals controlling the intensity control grid 160 and vertical drive plates 161 of CRT 149 will now be representative of the received sonic waveform as processed by signal processing circuitry 162, rather than the received sonic-$\Delta t$ data as processed by signal processing circuits 163. In addition to the $\bar{Q}$ output of flip-flop 139 switching from a continuous 1 to a continuous 0, the Q output of flip-flop 139 will switch from a continuous 0 to a continuous 1. This continuous 1 output is connected to one of the two inputs of AND gate 164. The other input to AND gate 164 from line 165 will not provide a 1 until the timing pulse $T_o$ from one-shot 153 is received at signal processing circuit 162. Signal processing circuit 162 will detect the timing pulse $T_o$ and will generate a synchronizing signal on line 165. Therefore, when the Q output of flip-flop 139 is a 1 and when signal processing circuit 162 generates a synchronization signal, flip-flop 166 is set by a pulse from AND gate 164. FIG. 10H is representative of the synchronization pulse from signal processing and receiving circuitry 162. When the flip-flop 166 is set, the 1 from the Q output will be applied to AND gate 143, such that clock pulses from clock source 142 will be gated through AND gate 143 to OR gate 141. Therefore, the electron beam 167 of CRT 149 will continue its sweep across screen 168. However, since the pulse rate of clock source 142 in this example is twice the rate of clock source 140, the sweep rate across the second half 169 of the screen will be double the sweep rate of the electron beam across the first half 170 of the screen. The last half of FIG. 10E and the last portion of FIG. 10F are representative of the output of OR gate 141 and D/A converter 145 respectively after the faster rate clock 142 is gated to binary counter 144.

Thus, it can be seen that after the system of FIG. 6 has been initiated by a pulse from depth pulse generator 136, a sample of the received sonic-$\Delta t$ data is used to control the electron beam 167 of CRT 149 such that representative indicia is displayed on portion 170 of the CRT screen 168. After the sample of sonic-$\Delta t$ data has been displayed, and after the electron beam 167 of the CRT 149 has traversed portion 170 of screen 168 as determined by decoder 150 decoding a preselected count, the sweep of electron beam 167 is stopped or interrupted if flip-flop 139 has been set until a synchronizing pulse is generated. This synchronizing pulse is representative of the burst of acoustic energy being transmitted into the earth formation. With the occurrence of the synchronizing pulse, the electron beam 167 resumes its sweep, but at a different rate (in this case an increased rate) so that the CRT display may more accurately represent a subsequently received high frequency sonic signal. Eventually, of course, sometime after a wave shape representative of the sonic signal has been displayed on the CRT screen 168 electron beam 167 will have traversed the full width of screen 168 of CRT 149. At this time, counter 144 will have counter up to a value representative of electron beam 167 completely traversing the CRT screen 168. Decoder 150 will then generate an output on line 171 which is used to reset flip-flops 137, 139, 180 and 166; binary counter 144 and the switching circuit 159. This resetting pulse shown in FIG. 10T means, therefore, that there will be no further Q output from flip-flop 166 which in turn means that no further clock pulses from clock source 142 will be passed through AND gate 143. Furthermore, since the resetting pulse was also applied to the reset of binary counter 144, this counter will be reset to a binary zero output. The pulse on line 171 from decoder 150 is also used to reset flip-flops 137 and 139 so that clock pulses from first clock source 140 may again be applied through AND gate 138 to OR gate 144 when the next pulse from depth pulse generator 136 sets flip-flop 137. The operation of flip-flop 180 will be explained hereinafter. Finally, the reset signal is used to change switching circuitry 159 so that the output is no longer an analog signal representative of a sonic waveform, but is again representative of sonic-$\Delta t$ data (standard log). There is shown in FIG. 10J a representation of a typical signal applied to the vertical and intensity inputs which control electron beam 167 of CRT 149 during one complete horizontal sweep of the electron beam. In addition, there is shown in FIG. 6 on screen 168 of CRT 149 a representation of the image resulting from the modulated electron beam due to a single sweep. Therefore, it can be seen that during the first portion of the electron beam sweep across the CRT screen, a short data pulse representative of a sample of the sonic-$\Delta t$ data would occur. This data pulse shown at 172 in FIG. 10J would be displayed on CRT screen 168 of FIG. 6 in portion 170 as line 173. Then, after the electron beam stopped its horizontal sweep across the CRT screen, a pulse representative of the sonic transmitter firing would occur which is represented by pulse 174 in FIG. 10J and illustrated on portion 169 of CRT screen 168 as trace 175 in FIG. 6. This pulse would result in the horizontal sweep starting up again at a faster rate than before. Shortly thereafter, the received sonic signal would be received (wave shape 176 in FIG. 10J and portion 177 of the trace in FIG. 6). After the sonic signal has been received and displayed and the circuitry reset by way of the resetting pulse from decoder 150, the circuitry of this invention would wait until a new pulse occurred from depth pulse generator 136. When a new depth pulse occurs, the above-described procedure is repeated so that a new sample of sonic-$\Delta t$ data and a new intensity and vertical modulated trace representative of a received sonic signal is displayed. As was discussed in the other described embodiments, a recording medium 178 shown in FIG. 6 is incrementally moved so that the display generated by successive sweeps of the electron beam are recorded at spaced intervals on recording medium 178. It should also be understood, of course, that although the recording medium 178 is shown in FIG. 9 as being spaced a substantial distance away from the screen 168 of CRT 149, in actuality recording medium 178 will substantially be in direct contact with screen 168 of CRT 149. This incremental movement of the recording medium is accomplished by the reset pulse on line 171 from binary decoder 150 also being applied to power amplifier 179 which in turn provides the necessary stepping pulse to step motor 180A used to drive recording medium 178. Thus, it can be seen that at the end of each electron beam sweep the recording medium 178 will be incremented the proper interval in preparation for the following sweep of the electron beam.

In the mode of operation just described, the firing pulse generator 152 was initiated or triggered by an output from binary decoder 150. Under some circumstances, it may be desirable that firing of the firing pulse generator 152 be substantially independent from the control of the surface equipment. However, even if this is so, it is still necessary that this system synchronize in some manner the received sonic signals, depth level, and sweep of the electron beam 167. The system of FIG. 6 may so operate by placing switches 132 and 133 into the position shown by the dashed lines which is hereinafter referred to as the second mode. FIG. 11 is representative of signal outputs of the components of FIG. 6 when FIG. 6 is operating in the second mode. The operation of this second mode is very similar to the first mode heretofore described, except in that portion of the system circuitry which initiates the sweep of electron beam 167. As shown in FIG. 6, when switch 132 is in the position illustrated by dash lines, the pulse from depth pulse generator 136 cannot be applied directly to flip-flop 137 to initiate the sweep of electron beam 167. In this second mode of operation, the depth pulse from depth pulse generator 136 as is illustrated in FIG. 11A will instead set flip-flop 180 which results in a 1 signal from the Q output of flip-flop 180 being applied to one of the inputs of AND gate 181. The output of flip-flop 180 is illustrated in FIG. 11B. AND gate 181 will then apply a pulse by way of switch 132 to the set input of flip-flop 137 when a 1 signal is applied to AND gate 181 by way of connecting line 182. The signal on connecting line 182 will be a pulse representative of an output signal from timing oscillator 183. Therefore, after flip-flop 180 has been set by depth pulse generator 136, a subsequent pulse from timing oscillator 183 will result in a 1 output from AND gate 181 which will set flip-flop 137 and thereby initiate the sweep of electron beam 167 across screen 168 of CRT 149. The pulse from timing oscillator 183 as well as the resultant pulse from AND gate 181 are illustrated in FIG. 11C. Therefore, it can be seen that in the second mode the sweep of the electron beam is initiated by a pulse output from AND gate 181 illustrated by FIG. 11C, whereas in the first mode the electron sweep was initiated simply by a depth pulse as illustrated by FIG. 10A. Once the electron beam sweep is initiated, the operation of the system continues in the same manner as described in the first mode of operation except that firing pulse generator 152 is not triggered by the output pulse on line 151 from binary decoder 150. FIGS. 11D – 11H correspond to FIG. 10C – 10G and represent outputs from the same components. It should be recalled that the pulse from binary decoder 150 on line 151 illustrated in FIG. 11H occurs when binary counter 144 has accumulated or counted the number of clock pulses necessary to sweep electron beam 167 across the first portion 170 of screen 168. The firing pulse generator 152 is triggered in the second mode of operation in the following manner. In addition to combining with a pulse from the depth pulse generator 136 to initiate sweep of the electron beam, the pulses from timing oscillator 183 are also used to trigger an output from firing pulse generator 152 after a suitable delay by delay circuit 184 and suitable wave shaping by one-shot 185. Delay circuit 184 delays the pulse from timing oscillator 183 by substantially the same amount of time required for electron beam 167 to sweep across the first portion 170 of screen 168. FIG. 11T illustrates the delayed pulses from one-shot 185. This means, therefore, (compare FIGS. 11H and 11I) that although the firing pulse generator 152 is not triggered by the pulse on line 151 from binary decoder 150, a pulse will be produced by firing pulse generator 152 at very nearly the same time that electron beam 167 completes its sweep across portion 170 of screen 168. Therefore, the pulse on line 151 and generated by binary decoder 150 sets flip-flop 139 (assume N of divide-by-N circuit 155A is one and switch 155B is in the position shown) which stops the beam sweep resulting from pulses from clock source 140 at very nearly the same time downhole firing pulse generator 152 is triggered. Signal processing circuit 167 will then generate a synchronization signal in response to timing pulse T to set flip-flop 166 and start the beam sweep in the same manner as described in conjunction with the first mode of operation. Therefore, except for the differences just described, the operation of the second mode is the same as described above concerning the first mode, and explanation of the remaining system will not be repeated. The remaining FIGS. 11J – 11L correspond to FIGS. 10H – 10J and are representative of outputs from the same components. However, it should also be noted that flip-flop 180 is reset by the pulse output on line 171 from binary decoder 150 along with the other components already discussed.

The cathode-ray tube of the described recorder is typically so responsive that it is also possible in accordance with another feature of the present invention to get at least two distinctive recordings with very little duplication of apparatus. For example, now referring to FIG. 12, in conjunction with FIG. 6, it can be seen that by replacing the CRT and associated apparatus outlined by the dashed line 186 with the circuitry of FIG. 12, two seperate recordings may be obtained. Except for that portion of the circuitry outlined by dashed lines 186 and replaced by the circuitry of FIG. 12, it will be appreciated that the remainder of the circuitry of FIG. 6 operates as heretofore described. The operation of the duplicated circuitry, therefore, will not be described again and only those portions contained in FIG. 12 will be described at this point. In this embodiment, it can be seen that the combination circuitry 187 of FIG. 12 combines the signal output from switching circuitry 159 of FIG. 6 with a suitable bias voltage from OR gate 188 for application to the vertical drive plates 161. However, the bias voltage applied to combination circuitry 187 alternately switches between two distinct values with each sweep of the electron beam of the CRT. This switching is accomplished by the reset output on line 171 from binary decoder 150 being applied to the clock input of flip-flop circuitry 189 which Q and Q̄ outputs alternately energizes divide-by-N circuits 190A and 190B. The output of divide-by-N circuits 190A and 190B energize one-shots 191 and 192 respectively. Although the N's of the divide-by-N circuits 190A and 190B could be set to any value, assume for the present that N in both circuits 190A and 190B is equal to one. The use of values of N other than one will be discussed hereinafter. Therefore, it can be seen that recording medium 178 driven by stepping motor 180 and power amplifier 179 will move the recording medium 178 an incremental distance when one-shot 191 is energized. And, stepping motor 193 driven by power amplifier 194 will move recording medium 195 when one-shot 192 is energized. Since one-shots 191 and 192 are energized alternately, it is obvious that the two recording mediums will be moved alternately. In addition to the output from flip-flop 189 energizing one-shots 191 and 192 respectively, it is also seen that these outputs are applied to AND gates 196 and 197 such that these AND gates are also energized alternately. Therefore, it can be seen that a first output from bias circuitry 198 will be applied through AND gate 196 and OR gate 188 to combination circuitry 187 for one sweep of the CRT, and then on alternate sweeps a second bias voltage from biasing circuitry 198 will be applied to combining circuitry through AND gate 197 and OR gate 188. The purpose of the two bias voltages from biasing circuit 198 is to position the electron beam 167 at two different vertical locations on the CRT screen 168 such that the electron beam alternately transverses the screen at a first vertical position corresponding to the location of a first fiber optics strip 199 which is in contact with recording medium 178 and then shifts its location to alternately transverses the CRT screen at a second vertical position which corresponds to the location of the second fiber optics strip 200 which is in contact with the second recording medium 195. Therefore, two recordings may be provided at the same time by simply alternating or shifting the sweep of the electron beam from one fiber optic strip to a second fiber optic strip. High quality recordings are readily produced by this technique. However, since alternate sweeps of the electron beam are directed to the two different recording mediums, it will be appreciated that the resolution or the number of points on the recording medium will be only half that of the previously-described embodiment. To correct this, if desired, it is only necessary to increase the sweep rate or double the output of the depth pulse generator 136 to achieve the same resolution obtained by the earlier embodiment. It should also be noted that although the embodiment discussed above includes only two separate recording mediums, additional recording mediums could be included in a similar manner.

In addition to providing two recordings, this embodiment also offers the advantage of using two different scales for the different recordings. For example, if an expanded depth scale was desired on one of the recordings, it would only be necessary to increase the interval moved by the recording medium in response to one of the stepping motors, or each interval moved by the two recording mediums could be the same, and the value of N of one or both of the divide-by-N circuits 190A and 190B could be such that the number of traces recorded on each recording medium is different. It should also be apparent that certain parameters could be recorded exclusively on one recording and not on the second recording, or in a similar fashion, it might be possible to double the number of different data parameters being recorded.

It is to be understood that downhole investigating apparatus other than sonic type apparatus such as that shown in FIGS. 1 and 4 could be utilized with the unique recording features of the present invention. For example, the rotating induction logging apparatus shown in U.S. Pat. No. 3,187,252 granted to E. T. Hungerford on June 1, 1965 could be utilized in place of the televiewer apparatus as a circumferential scanning type of investigating apparatus.

Figure 13:
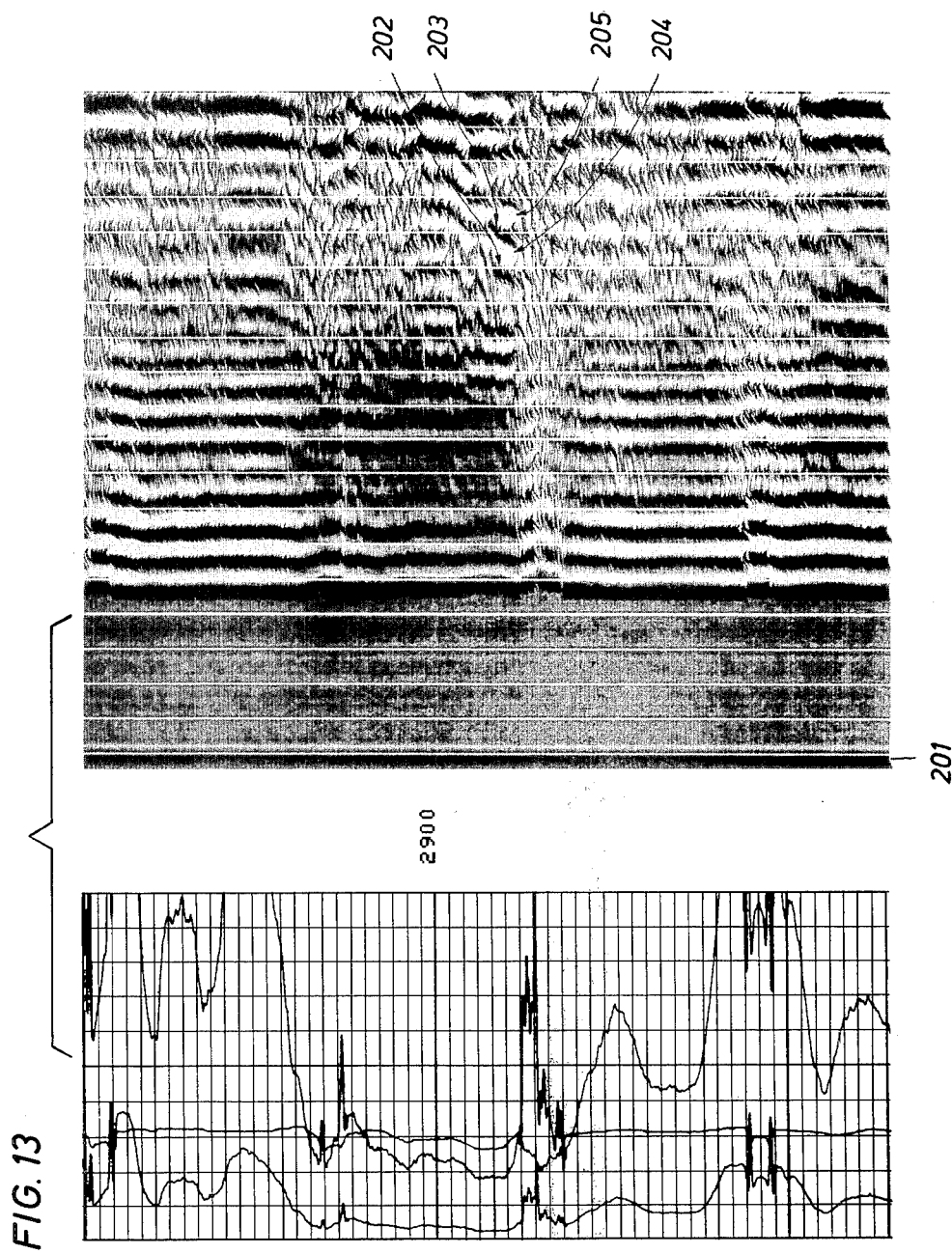
FIG. 13 is illustrative of a typical three-dimensional log which may be produced by the new and improved apparatus of FIG. 6.

Turning now to FIG. 13, there is shown an actual example of a typical log produced on a recording medium representative of many successive sweeps of the CRT electron beam. This representative log was actually produced by circuitry of the type illustrated in FIG. 6. The left hand side of the log represents several standard traces, whereas the three-dimensional appearing portion on the right hand side represents a sonic waveform log (unusual log). The dark peak 201 on the left hand side of FIG. 13 corresponds to the recurring event represented by the transmitter firing signal of FIG. 10H. Likewise, the dark peaks designated 202 and 203 correspond to positive portions of the received signal, and the very light negative peaks 204 and 205 correspond to negative portions of the received signal. It is to be understood that FIG. 2, described earlier, is an enlarged representation of the trace generated during the unusual recording portion of one sweep across the recording medium while the illustrated log designated as FIG. 13 comprises a plurality of such sweeps in combination with several standard logs.

Figure 14:
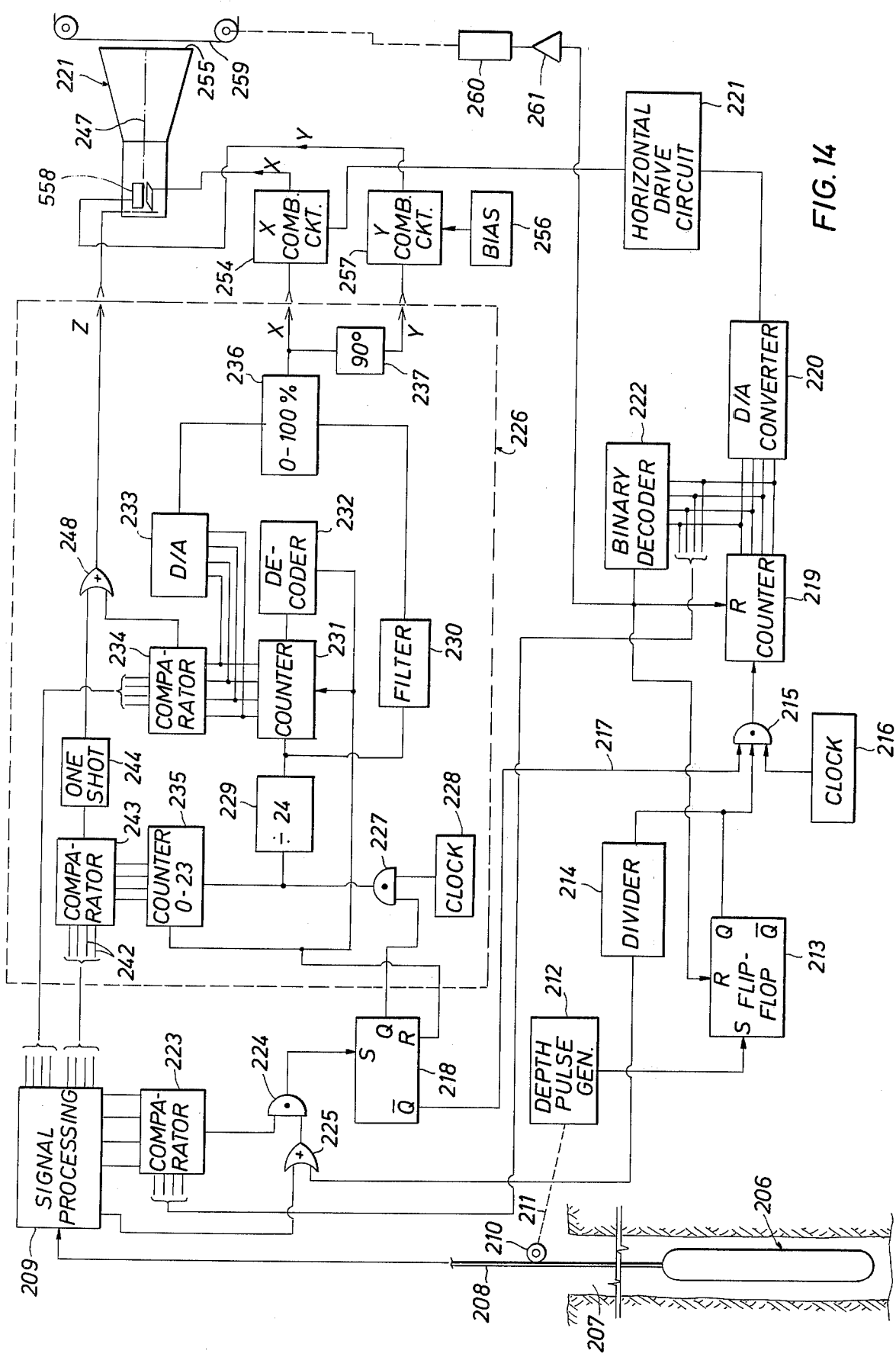
FIG. 14 shows apparatus for recording vectors or arrows in accordance with yet another embodiment of the present invention.

Now referring to FIG. 14, there is shown apparatus for recording data such as formation inclination and azimuth or wellbore inclination and azimuth as vectors on a recording medium; the horizontal location of the vectors on the recording medium and the direction that the vectors point being representative of the inclination-magnitude and azimuth respectively. As in the previously discussed embodiments which were concerned with producing a three-dimensional sonic log, an investigating device 206 is raised and lowered within a wellbore 207 by way of multiconductor cable 208 for purposes of investigating the characteristics of the earth formations lying adjacent to the wellbore. The data generated by investigating device 206 is transmitted to the surface of the earth by way of the conductors in multiconductor cable 208 where it is then applied to signal processing circuits 209. There are at least two types of inclination and azimuth recordings which may be produced by the present apparatus. The type of recording produced is determinative of the circuitry necessary to be contained in the signal processing circuits 209. For example, if the investigating device 206 is for determining the inclinationmagnitude and azimuth of the wellbore, signal processing circuits 209 may simply comprise two A/D conversion circuits. Analog data indicative of the wellbore inclination-magnitude is determined by an inclination detection unit contained in investigating device 206 and is then transmitted to the earth's surface where it is digitized by the A/D converters and made available for use by the circuitry of this invention. The inclination detection unit may typically comprise a pendulum cooperatively arranged with a potentiometer for providing an analog indication of the deviation between the longitudinal axis of the well tool and a vertical position as indicated by the pendulum. Similarly, analog data indicative of the direction of the inclination (azimuth) with respect to some reference point is determined by an azimuth indication unit also contained in investigating device 206 and transmitted to the earth's surface where this data is also digitized by one of the A/D converters and made available for use by the circuit of this invention. The azmiuth indication unit typically includes a magnetic bar (compass) and a combination of potentiometers cooperatively arranged such that the direction of the inclination with respect to magnetic North is determined. A complete discussion of apparatus of the type just described may be found in U.S. Pat. No. 2,746,162. Other suitable techniques for determining the magnitude and azimuth of the inclination of the wellbore which are suitable for use with the present invention are also presently available. Examples of these other techniques may be found in U.S. Pat. Nos. 3,699,510; 3,691,363; 3,137,077; 3,079,697 and 2,940,177. In some of the teachings described in the above-listed patents, the inclination and azimuth information is provided at the surface already in the form of digital data. In such cases, the signal processing circuit 209 may simply comprise two registers for holding the data until it is needed for use by the circuitry of this invention. In other techniques, the data is transmitted to the earth in the form of a series of pulses and must be decoded prior to being made available for use by the circuit of this invention. However, techniques for converting data into digital form from other forms are readily understood by those skilled in the art and need not be further discussed herein.

Determining the magnitude and direction of the inclination of subsurface formations which are adjacent to the borehole, is typically much more complex than simply determining the magnitude and direction of the wellbore inclination. Recordings or logs indicative of formation inclination-magnitude and azimuth are commonly called dipmeter logs. Processing of at least seven different measurement parameters are typically necessary if high quality dipmeter logs or displays are to be produced. In the past these measurements were typically processed and dipmeter information displayed by special apparatus. For example, U.S. Pat. No. 3,217,242 is typical of the technique for processing data and providing dipmeter display. In other instances, the necessary measurements would be sent to the surface and processed by a general purpose computer such that data representative of the magnitude and direction of the subsurface inclination were produced from the seven measurements. Then, this data would be tabulated and correlated with the depth from which they were derived. The tabulated and depth correlated data is then available for manually producing the dipmeter logs or the data may be further processed and applied to a typical "X" - "Y" recorder for automatically producing the log. A computer program suitable for processing these seven measurements and providing the corresponding magnitude and direction of inclination measurements is commercially available from IBM (International Business Machines). The program is entitled, "Dipmeter Log Processing", and is prepared for processing on the IBM/360 computer. The identification number of the program is H20-0016. The data provided by the computer program is also suitable for use with the vector recorder of the present invention.

Thus, it can be seen that the apparatus comprising the signal processing circuit 209 may vary from nothing more than two A/D converters, to a complete general purpose computer. However, regardless of the type of circuitry contained in signal processing circuits 209, these circuits will provide at least two distinct sets of digital data necessary for generating each vector or arrow on a recording medium by the apparatus of this invention. It should also be appreciated that in the situation where signal processing by circuit 209 simply comprises A to D conversion, the necessary circuitry may readily be included in the recorder itself and not require additional external circuitry.

Figure 15:
FIGS. 15 – 21 graphically represent voltage waveforms at various points of the circuitry of FIG. 14.
Figure 16:
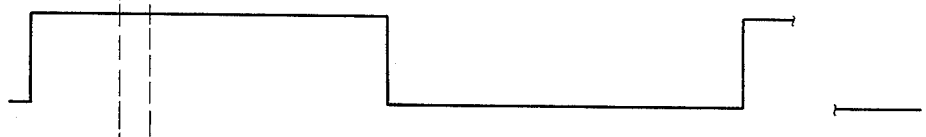
Figure 17:
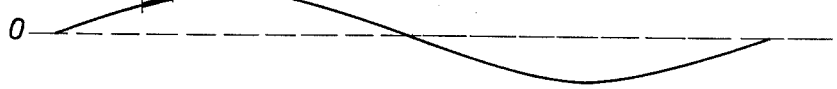

As was true in the earlier discussed embodiments of this invention, the movement of cable 208 rotates measuring wheel 210 and connecting shaft 211 in such a manner that depth pulse generator 212 provides an output pulse at predetermined intervals of wellbore depth to the set input of flip-flop 213. Therefore, in response to the applied depth pulse, a 1 signal appears at the Q output of flip-flop 213. This 1 signal is applied to divider circuit 214. The Q output of flip-flop 213 is also applied to one of the inputs to AND gate 215. One of the other two inputs of AND gate 215 being a clock source 216 and the third being supplied by connecting line 217 from the $\overline{Q}$ output of flip-flop 218. The control of flip-flop 218 will be further discussed hereinafter. However, it will be sufficient, at this point, to recognize that flip-flop 218 will be presently in the reset condition such that the $\overline{Q}$ output is a 1. Therefore, since two of the inputs to AND gate 215 are continuous 1's and since the other input is a pulsating or clock signal, it can be seen that the output of AND gate 215 will also be a pulsating signal which is representative of the output of clock source 216. The output from AND gate 215 is then applied to binary counter 219. The binary output from binary counter 219 is applied to three different circuit elements. It is applied to D/A converter 220 for purposes of providing a ramp signal to the horizontal drive circuit of CRT 221 in a manner somewhat similar to that discussed in the previous embodiments. It is applied to binary decoder 222 for purposes of resetting the circuitry at the end of a beam sweep as will be discussed further hereinafter. In addition, it is applied to comparator 223 for purposes that will now be described. As was discussed earlier concerning the apparatus comprising signal processing circuits 209, there is a digital output from circuits 209 representative of the amount or magnitude of dip of the vector to be displayed on the recording medium. Thus, it can be seen that digital comparator 223 receives digital data from digital counter 219 representative of the ramp signal used for horizontal drive of the electron beam and also receives digital data representative of the magnitude of dip to be represented by the vector. Thus, digital comparator 223 will at some point during the horizontal sweep of the electron beam sense that the two digital inputs are identical and will at that point provide a pulse output to AND gate 224. The other input to AND gate 224 is representative of a command to print the vector and, in the present embodiment, is provided by the output of OR gate 225. In the embodiment shown, there are two inputs to OR gate 225 either of which may be used as a command to print a vector. One of these signals is provided by the circuitry contained in signal processing circuitry 209. This signal will be provided whenever circuitry 209 determines that sufficient change in the dip magnitude and direction data has occurred to warrant printing a new vector. The other input to OR gate 225 is simply provided after a predetermined number of depth pulses have been applied to flip-flop 213 from depth pulse generator 212. Thus, if it is assumed that depth pulse generator 212 provides a pulse to flip-flop 213 every half inch, and if it is further assumed that the divide circuit 214 is a divide-by-24 circuit, then divide circuit 214 will provide an output to OR gate 225 at intervals representative of investigating tool 216 traversing 1 foot of wellbore 207. Thus, because of these two signal inputs, OR gate 225 will provide a command to print a vector at no less than at every 1-foot interval. Therefore, if a command to print a signal has been applied to AND gate 224 from OR gate 225 and if comparator 223 has provided an output indicating that the electron beam has traversed a horizontal distance which places it at a location on the recording medium which is representative of the magnitude of dip desired to be indicated by the vector, then AND gate 224 will provide a signal to the set input of flip-flop 218. When the flip-flop 218 is set, the $\overline{Q}$ output will, of course, change from a 1 condition to a 0 condition and thereby inhibit further pulses from passing through AND gate 215 to binary counter 219. At the same time, of course, the Q output of flip-flop 218 will change from a 0 condition to a 1 condition. The 1 signal from the Q output of flip-flop 218 is applied to the arrow or vector generating circuit 226 to initiate the generation of a vector on the recording medium. Within vector generating circuit 226, this Q output is applied to one of the inputs of AND gate 227 and thereby allows AND gate 227 to pass clock pulses from the 240 KHz clock source 228. This 240 KHz clock signal provided by AND gate 227 is applied to a divide-by-24 circuit 229 which produces a symmetrical high and low output which is then passed through a filter 230 to create a sine wave. FIG. 15 is representative of 24 of the 240 KHz square wave pulses from AND gate 227; FIG. 16 is representative of one of the 10KHz symmetrical square wave outputs of the divide-by-24 circuit 229, and FIG. 17 is representative of one cycle of the 10KHz sine wave output provided by filtering the 10KHz square wave. The 10KHz square wave output from divide circuit 229 in addition to being applied to filter circuit 230 is also applied to counter circuit 231 which in turn supplies a digital representation of the number of 10KHz square wave pulses produced by divide-by-24 circuit 229. The digital output from counter 231 is applied to digital decoder 232, to D/A converter 233, and to digital comparator 234. For reasons which will become apparent, hereinafter, when counter 231 counts up to 60, decoder 232 will send out a reset signal to counters 231 and 235. This reset signal in addition to resetting counters 231 and 235 is also used to reset flip-flop 218 which initiated operation of the vector generating circuit.

Figure 18:
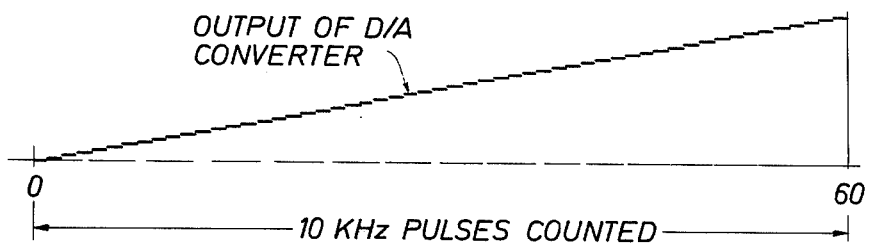
Figure 19:
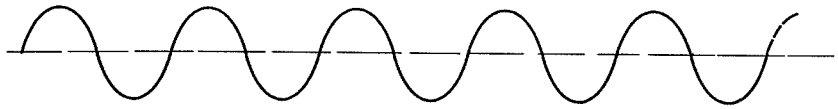
Figure 20:
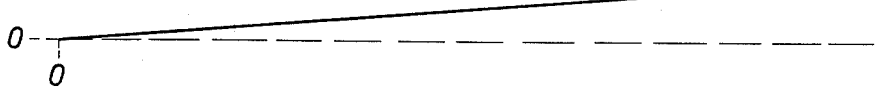
Figure 21:
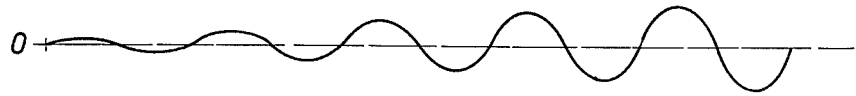

Now, if it is recalled that the output of counter 231 is applied to D/A converter 233, it can be seen that the output from the D/A converter will be substantially a ramp signal comprised of a series of small incremental and equal steps. Now, if it is recalled that counter 231 was reset at the end of 60 counts by a reset signal from decoder 232, it will be appreciated that the total ramp output signal from D/A converter 233 will be comprised of 60 of these small incremental steps. Referring to FIG. 18, there is shown a ramp signal representative of the output of D/A converter 233. Thus, it can be seen that the ramp output from D/A converter 233 increases from 0 to a maximum value over the same period of time required for the occurrence of 60 of the 10KHz sinusoidal cycles. The ramp signal from D/A converter 233 is applied to one of the two inputs of the 0% to 100% modulator 236, and the other input to modulator 236 is the 10KHz sinusoidal output from filter 230. Referring to FIGS. 19 and 20 respectively, there is shown a representative example of five of the 60 10KHz cycles which are applied to modulator 236 from filter 230 and that portion of the ramp signal from D/A converter 233 which is also applied to modulator 236 during the same period of time. It is to be understood, of course, that even though only five cycles are shown, the ramp signal continues to increase at a linear rate for a period of time equivalent to the occurrence of 60 of these 10KHz sinusoidal waveforms. Thus, if the ramp signal from D/A converter 233 represented by FIG. 20 is used to modulate the sinusoidal input, it will be appreciated that the output of modulator 236 will comprise a constant frequency sinusoidal wave shape having a peak amplitude which increases linearly from 0 up to some maximum value. FIG. 21 is illustrative of how such a wave shape might appear over the first five sinusoidal cycles. The output of modulator 236 is then made available for driving the horizontal (or vertical) input of a CRT. In addition, the output of modulator 236 is also applied to a 90° phase shifting circuit 237 whose output is then available for providing the vertical (or horizontal) drive of a CRT. The two outputs available for driving the horizontal and vertical inputs of a CRT therefore are identical except that one is phase shifted 90° from the other. The application of these two amplitude increasing sinusoidal signals to the vertical and horizontal drive circuits of a CRT will result in the CRT electron beam being directed in an increasing spiral pattern. This may better be understood if it is recalled that if two constant amplitude sinusoidal signals phase shifted 90° apart are applied to the horizontal and vertical inputs of a CRT, the typical circular lissajous pattern is produced. FIG. 22 diagramatically illustrates the formation of a circular lissajous pattern on a CRT screen. Curve 238 represents the input to the horizontal drive of the CRT, and curve 239 which is 90° out of phase with curve 238 represents the input to the vertical drive of the CRT. However, if the amplitude of the sinusoidal signals is increasing linearly as do the outputs from modulator 236 and 90° phase shifted circuit 237, instead of the electron beam being driven in a circular lissajous pattern, the electron beam will be driven in a spiral pattern. FIG. 23 diagramatically illustrates the spiral pattern produced on a CRT if the input to the horizontal drive shown as curve 240 is similar to five cycles of the linear increasing 10KHz sine wave produced by modulator 236, and the input to the vertical drive shown as curve 241 is the same signal phase shifted 90°. How driving the electron beam in a spiral pattern can be used to produce a vector will become apparent as the rest of the circuit is explained.

In addition to applying the 240 KHz clock pulses to the divide-by-24 circuit 229, AND gate 227 also provides these clock pulses to binary counter circuit 235. In the present embodiment, binary counter circuit 235 provides a binary output varying between 0 and 23. After the 23rd pulse has been received by binary counter 235, the counter recycles to 0 on the next pulse and again counts to 23. This counting between 0 and 23 continues until no further pulses are received from AND gate 227 or until reset. Therefore, it can be seen that 24 complete cycles of the square wave produced by clock source 227 will be counted by counter circuit 235 for each square wave cycle produced by divide-by-24 divider circuit 229. Recall again that FIGS. 15 and 16 represent 24 of the 240KHz cycles and one of the 10KHz cycles respectively. It is also of importance to note that these two square waves even though having a substantially different frequency are synchronized. Consequently, it can also be seen that the 10KHz sinusoidal wave shown in FIG. 17 and which is produced by filter circuit 230 and corresponds to the 10KHz square wave is also synchronized with the 240KHz clock pulses. This synchronization of the 10KHz sinusoidal wave and the 240KHz square wave (clock pulse) is used in the present embodiment as will presently be explained to divide the sinusoidal wave into 24 equal parts.

Referring now to FIG. 24, there is shown a circle divided into 24 equal segments having 15° each. Now if the circle is considered to represent a compass-rose, and if North is considered to be as shown and all other points on the compass proceed counter-clockwise as shown, then the direction of dip of any formation or of a borehole may be located in one of the 24 segments shown and labelled as 0 through 23. For example, if the direction of dip is actually 48°, then the segment labelled 3 would contain the direction of dip. Thus, it can be seen that any direction of dip can be represented by one of the segments 0 through 23 with an error no greater than 15°. (Of course, counter 235 could have a greater capacity and thereby provide better resolution.) Now, since the signal processing circuits 209 which receive the well logging data indicative of the dip direction will be operably arranged to provide a digital output equivalent to some value (between 0 and 23) on lines 242 to comparator 243 which output is representative of the segment of the compass containing the dip direction to the closest 15°, and since counter 235 also provides a digital output ranging between 0 and 23 it can be seen that comparator 243 will provide a pulse output to one-shot 244 once for each cycle of the 10KHz sine wave. Furthermore, since the digital signal applied to comparator 243 from signal processing circuits 209 will not change while a vector is being generated it can also be seen that the output pulse from comparator 243 will occur at the same angular location of each of the 60 cycles of the 10KHz sine wave. Thus, if as in the previous example, the direction of dip is approximately 48° then signal processing circuit 209 would provide an output equivalent to a binary 3 since the segment of the compass designated by a binary 3 contains the compass direction equivalent to 48°. Eventually, therefore, when the other input (from counter 235) to comparator 243 is binary 3, the comparator will provide an output. Thus, returning to FIGS. 15 and 17 which show 24 cycles of the 240KHz square wave and the resulting 10KHz sine wave respectively, it can be seen that comparator 243 will provide an output during the fourth 240KHz pulse labelled 245 shown in FIG. 15 which corresponds to that part of the sine wave also designated 245 in FIG. 17. Therefore, the output of comparator 243 triggers one-shot 244 which provides a short pulse output which occurs simultaneously with that part of the 10KHz sinusoidal curve labelled 245 for each of 60 cycles of the 10KHz signal and which will be used in generating the desired vector. Now referring again to FIG. 23, in conjunction with FIG. 17 and recalling that curve 240 of FIG. 23 is representative of the output of modulator 236, it can be seen that since one-shot 244 provides a short pulse output simultaneously with the occurrence of portion 245 of FIG. 17 for each of the 60 cycles of the 10KHz comprising the vector and that this pulse also occurs simultaneously with the occurrence of portions 246 of FIG. 23. Now, since the electron beam 247 of CRT 221 is normally in the "blanked" or off mode, it can be appreciated that since the unblanking pulse will be provided by one-shot 244 by way of OR gate 248 at the same angular position of each of the cycles which comprise the spiral described by the electron beam that a series of dashes will be produced on the screen of the CRT. This series of dashes generates a vector having a particular orientation. Therefore, referring to spiral 249 of FIG. 23, it can be seen that for the five illustrated cycles of the spiral, the electron beam of the CRT will be unblanked or turned on only during those portions of the spiral shown at 250. FIG. 25, which is illustrative of the vector produced for the complete 60 cycles, also illustrates a circle at the origin of the vector, the generation and purpose of which will now be described.

Since only vector line 251 of FIG. 25 is produced by the circuit thus far described, it can be seen from FIG. 25 that without circle 252, this vector might be interpretted as indicating the dip direction was in either of two possible, yet exactly opposite, directions. That is, if there is no way of knowing which end of the vector line is the origin, then the direction of dip might be interpretted as being 180° different than it really is. In addition to misinterpretting the direction of dip by 180°, it would also be impossible without knowing which end of the vector line was the origin to determine the exact degree of angle or formation dip. That is, which end of the vector line should be assumed to be representative of the dip angle. FIG. 28 which will be discussed in detail, hereinafter, illustrates a vector with an origin circle. From vector 251 of FIGS. 25 and 28, it can be seen that if the vector had no indication of origin, it would be impossible to know whether or not the vector was representative of a dip angle of approximately 55° and at a compass orientation of about 45° or a dip angle of 63° and a compass orientation of 225°. For these reasons, it is desirable to indicate by some means, such as the circle 252, which end of the vector line is the origin. To provide the desired indication (circle 252) of the point of origin of a vector produced by the circuitry of this invention, the present embodiment also includes comparator 234 which receives at one input the digital data from counter 231 representative of the number of 10KHz square wave cycles counted by the counter. It should be recalled that counter 231 will provide a digital output up to a count of 60 and is then reset to 0 by a signal from decoder 232. In addition to the digital input to comparator 234 from counter 231, comparator 234 also receives a digital input from signal processing circuitry 209. This digital input from circuits 209 may typically be simply a preselected digital number representative of some value between 0 and 60. Thus, if we assume that in the present embodiment the input to comparator 234 from signal processing circuits 209 is the digital equivalent to 10, it can be seen that when counter 231 provides a digital count equivalent to 10 to comparator 234, comparator 234 will provide an output to OR gate 248 which is coincidental with the occurrence of the 10th cycle of the possible 60 cycles. It will be appreciated, of course, that the size of the circle around the vector origin could also be used to convey information concerning the dip or inclination of a formation. For example, available dipmeter programs vary the diameter of the origin circle with the reliability of the computed vector. That is, the larger the diameter, the more confidence that can be placed in the computed vector. Therefore, referring again to FIGS. 25 and 28, it can be seen that the combination output from OR gate results in a vector line 251 produced by a series of small dashes which occur at the same angular position of each cycle of a spiral and a circle 252 which encircles the origin point of the vector line.

Therefore, in summary, the signal processing circuit 209 provides: (a) information to comparator 223 representative of the dip angle of the formation, which dip angle is then correlated to a particular horizontal position on the recording medium, as is illustrated in FIG. 28, representative of the origin of the vector (circle 252 in FIG. 28); (b) information to comparator 243 representative of the compass orientation of the dip of the formation which compass orientation is then correlated to the orientation of the vector on the recording medium; and (c) information to comparator 234 which determines the diameter of the origin circle of 252 of the vector as shown in FIGS. 25 and 28. Now, with regard to the operation of comparator 223, the position of the horizontal sweep is provided from counter 219 to comparator 223 and starts the operation of the vector generating circuit 226. When operation of circuit 226 is initiated, AND gate 227 will be enabled and pass clock pulses from clock 228 to counter 235. The output of counter 235 is then compared to the information provided to comparator 243 to unblank the CRT electron beam at the appropriate time during each cycle of the generated spiral to thereby produce the vector orientation. The proper diameter for the vector origin circle is produced by comparator 234 comparing the information from signal processing circuitry 209 with the output of comparator 231 to unblank the CRT electron beam during the appropriate cycle of the spiral to produce a complete circle. Thus, recalling that the output of D/A converter 220 is a ramp signal and also recalling that the output from modulator 236 is initially 0, it will be appreciated that the output from horizontal combining circuit 254 will also be a ramp signal until modulator 236 also begins providing an output. Thus, it can be seen that the electron beam 247 of cathode-ray tube 221 will initially be driven by a linearly increasing ramp signal which results in a constant rate sweep of the electron beam across screen 255 in a horizontal direction. Biasing circuit 256 provides a constant level DC signal to the vertical combining circuit 257 and since the other input to the vertical combining circuit 257 from the 90° phase shifting 237 is initially at 0, it can be seen that the output of the vertical combining circuit 257 which is connected to the vertical drive plates 258 of CRT 221 will be at the constant level DC until 90° phase shifting circuit 227 also provides an input to vertical combining circuit 257. Thus, it can be seen that as the electron beam 247 starts its horizontal sweep across screen 255 of CRT 221 it will have a predetermined vertical position on said screen. Then, at some point representative of where a vector is to be generated on a recording medium 259, the pulse input to counter 219 will be interrupted such that the horizontal sweep of the electron beam is stopped and maintained at a specific horizontal position on the CRT screen. In addition, the constant level DC signal applied to the vertical drive circuitry of the CRT will also maintain the vertical position of the electron beam in the same position. At the same time that the horizontal sweep is stopped, the vector generation circuit 226 is initiated. Therefore, the modulator circuit 236 will immediately start providing a sinusoidal 10KHz signal whose amplitude is linearly increasing from 0 and, at the same time the 90° phase shifting circuit 237 will supply a similar output as that of modulator circuit 236 except the signal provided by the phase shifted circuit will be phase shifted 90°. These two signals are then used to drive the CRT beam 247 in a spiral pattern, and the electron beam which has been blanked up to this point in time in this example is selectively unblanked to produce the vector in the manner heretofore discussed. After the vector has been generated, it will be recalled that decoder 232 provides a reset signal to flip-flop 218 such that the Q output is changed from a 1 to a 0 condition, thereby inhibiting any further output from the vector generation circuit 226. The $\bar{Q}$ output of flip-flop 218 will also be changed from a 0 to a 1 condition thereby again allowing the clock pulses from clock source 216 to pass to counter 219 by way of AND gate 215. Thus, it can be seen that at the end of the generation of the vector, the horizontal sweep of the CRT beam will again continue as it has prior to being interrupted. Then, at some point, the linear ramp signal which provides horizontal drive to the CRT beam will result in the electron beam 247 having traversed the full width of the CRT screen 255. The fact that the electron beam has completed the sweep across the CRT screen will be detected by binary decoder 222 which will then initiate a pulse which is used to reset counter 219 and flip-flop 213. In addition, the reset signal from binary decoder 222 will also be applied to stepping motor 260 by way of power amplifier 261. Stepping motor 260 is used to increment recording medium 259 located adjacent screen 247 of CRT 221 in the same manner as described heretofore in the previously discussed embodiments. Thus, it can be seen that at this point the recording medium has been incremented and the circuitry reset to initiate conditions such that it now is in a waiting mode until the next depth pulse arises from depth pulse generator 212. It should be noted at this point, that if the horizontal sweep is not interrupted for the purpose of generating a vector symbol, the electron beam will simply complete its horizontal travel at which point binary decoder 222 will reset the circuitry increment the recording medium 259 and wait for the next arriving depth pulse signal as before. FIGS. 26A and 26B are representative of the actual signals applied to the horizontal and vertical drive circuits respectively of electron beam 247.

Figure 27:
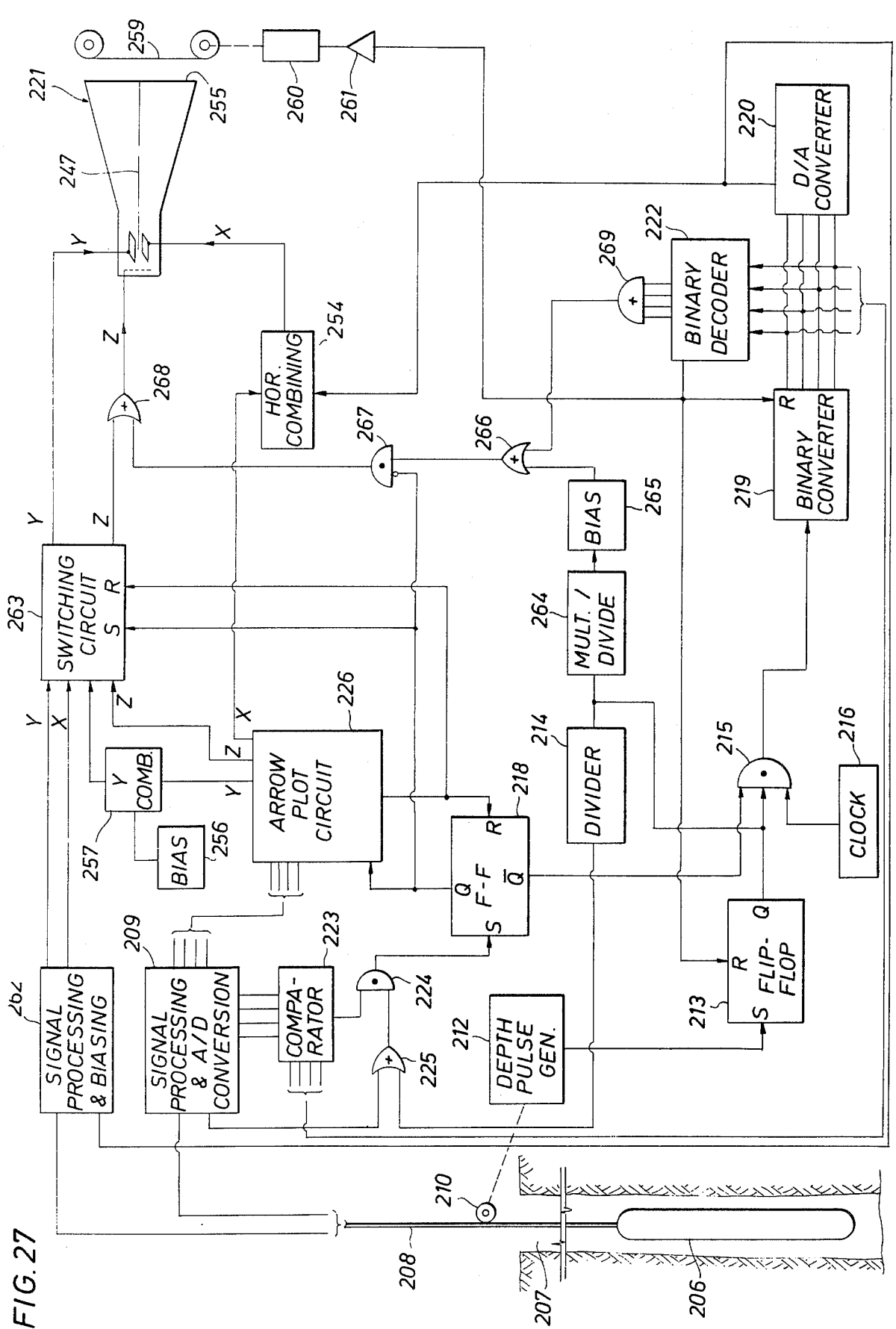
FIG. 27 shows apparatus for providing typical recordings in combination with recorded vectors according to another embodiment of the present invention.

As in the previously discussed embodiments concerning sonic logging, it is also likely that it would be desirable to produce an arrow-plot or vector log in combination with other types of logs such as are produced by the methods and apparatus taught in the previously discussed Elliott application. Referring now to FIG. 27 there is shown circuitry suitable for providing a combination vector log along with some other typical logs. One useful example of this would be to record a formation dipmeter log with a standard resistivity log. The apparatus shown in FIG. 27 in many ways operates the same as the apparatus previously discussed concerning the apparatus of FIG. 14. Therefore, those components of the apparatus which operate in the same fashion as previously discussed will maintain the reference numbers of the previously discussed apparatus and be discussed only briefly, if at all. The investigating apparatus 206 located in the wellbore 207 will contain in addition to the dip and direction formation investigating devices at least one additional investigating device for providing another type of well log. Therefore, in addition to multiconductor cable 208 providing data information to signal processing circuits 209, cable 208 will also provide data signals for another type of log to signal processing circuitry 262. As discussed earlier, depth pulses are provided by depth pulse generator 212 to initiate the horizontal sweep of the electron beam 247 of CRT 221. The measuring wheel 210, depth pulse generator 212, flip-flop 213, clock 216, AND gate 215, flip-flop 218, counter 219 and D/A converter 220, as well as the horizontal combination circuit 254, all operate in the same manner as discussed in connection with FIG. 14. However, it should be noted that D/A converter 220 in addition to applying a ramp signal to the horizontal combination circuit 254 also provides this ramp signal to the signal processing and biasing circuitry 262. This ramp signal is compared to a data signal from downhole investigating tool 206 for purposes of providing a mark on the recording medium at a horizontal location representative of the magnitude of the data signal. The operation of signal processing circuitry 262 is the same as circuitry 163 previously discussed in conjunction with FIG. 6. Therefore, it can be seen that the normal type of log or recording may be produced on the recording medium representative of the signals provided by signal processing circuitry 262 by passing the vertical drive signal and the intensity control signal through switching circuitry 263 to CRT 271. In the present embodiment, the intensity and vertical drive signals from signal processing circuits 262 are connected to the CRT when switching circuit 263 is in the reset condition. Now, assuming that a first portion of the recording medium is reserved for these type of well logging signals and a second portion is reserved for an arrow or vector recording, a suitable technique for providing combination recording will be discussed. D/A converter 220 will provide the horizontal drive to sweep the CRT electron beam completely across both portions of the recording medium. A standard log (amplitude versus depth) will be generated in the first portion of the screen, and then as the electron beam continues its sweep a command to print a vector may be provided to AND gate 224 from OR gate 225. As was discussed in the embodiment described in conjunction with FIG. 14, the command to print may occur at selected depth intervals by way of a signal from divide circuit 214 or in response to a command from the signal processing circuits 209. If a print command is not provided, the electron beam will simply complete its sweep across the recording medium and then be reset to await another depth pulse to again initiate a sweep. However, if a command to print is provided to AND gate 224 and if digital data from signal processing circuits 209 have been provided to comparator 223 representative of the particular horizontal location on the recording medium at which a vector is to be generated, it can be seen that comparator 223 will compare this data to the digital representation of the horizontal location of the electron beam and will at some point when the two digital signals are equal provide an output to AND gate 224 which AND gate will in turn set flip-flop 218 thereby activating the vector generating circuitry 226. The operation of circuitry 226 is identical to that previously discussed in connection with FIG. 14. However, it should also be noted that in addition to providing a signal which initiates the vector generating circuitry, the Q output of flip-flop 218 also provides a set signal to switching circuit 263. This set signal to switching circuit 263 operates to disconnect signal processing circuits 262 from CRT 221, and to connect vector or arrow-plot circuitry 226 to the CRT. Now recalling that after circuitry 226 has completed the task of generating a vector or arrow on screen 255 and on recording medium 259, a reset signal is applied to flip-flop 218. This reset signal operates on this combination circuitry in the same manner as it did in the previously discussed embodiment. However, in addition to being applied to the reset input of flip-flop 218, this reset signal is also applied to switching circuit 263 to switch the vertical and horizontal inputs of the cathode-ray tube 221 from the arrow-plot circuitry 226 back to the signal processing circuitry 262. With the reset of flip-flop 218, the horizontal sweep of electron beam 247 will continue and complete its sweep across CRT 221. As in the earlier described circuitry, when the electron beam has completely traversed the screen 255 of CRT 221, binary decoder 222 will increment the recording medium 259 and reset the circuitry for a following sweep.

Although the circuitry heretofore described will provide excellent combination logs, it is very desirable that some reference be available for correlating these logs with depth and also that some indication as to the magnitude of the recorded signal be provided. Therefore, there is also provided by the circuitry apparatus for providing such references. Recalling that flip-flop 213 is set by depth pulses representative of specific depth intervals being traversed by the logging tool 206, it can readily be appreciated that these pulses may be used to provide indications of depth. For example, if the depth pulse generator 212 is providing pulses for every half inch of wellbore traversed by the well tool then it can readily be seen that 24 of these pulses would be representative of well tool 206 traversing one foot of the wellbore. Therefore, if multiplier divider circuit 264 provides an output at every 24th pulse for the duration of the horizontal sweep of the electron beam 247, and if this output is used to turn on the electron beam, depth lines will be produced on the recording medium at 1-foot intervals. Thus, in the apparatus shown in FIG. 27, the Q output of flip-flop 213 is also applied to multiplier divider circuit 264, which in turn provides a signal to biasing circuit 265 during every 24th sweep of the electron beam. Biasing circuit 265 provides the necessary signal to the intensity control of CRT 221 by way of gating circuits 266, 267 and 268. Thus, it can be seen that during a sweep of the electron beam which corresponds to a particular depth level increment of 1 foot being traversed by the well tool, a line will be produced across the recording medium. For example, referring now to FIG. 28 there is shown a combination recording of a vector and two standard logs with depth lines at every foot.

Furthermore, it can be seen that the data produced on the recording medium may now be correlated with depth. However, it should be noted that AND gate 267 will inhibit a depth line or a portion thereof being recorded any time that arrow-plot circuitry 226 is in the process of generating a vector. The purpose of this is to avoid too much exposure on the recording medium if both the vector and the lines are being produced at the same point on the recording medium. Lines which run vertical on the recording medium and which are representative of the magnitude of a signal may also readily be produced by circuitry of this invention. Referring again to FIG. 27 there is shown binary decoder circuits 222. In the previous discussion in connection with the circuitry of FIG. 14, this decoder simply provided an output indicative of the fact that the horizontal beam had completed its horizontal travel across the recording medium. If, however, it is assumed that binary decoder circuit 222 is a more complex type of decoder which has the capability of decoding a multiplicity of many different counts from binary decimal counter 219 then it can be seen that with proper selection of which counts are to be decoded corresponding signals may be produced which can then be used for generating vertical lines hereinafter referred to as scale lines. Thus by combining these outputs by OR gate 269, these pulses representative of particular counts occurring may also be applied through gating circuits 266, 267 and 268 to the intensity control of CRT 221. Thus, it can be seen that any time decoder circuitry 222 decodes a number and provides a pulse output there will be a resulting mark produced on the recording medium. For example, if it is assumed that 1000 counts or pulses are required to completely sweep the electron beam across the recording medium, and if it is further assumed that the regular logs are to be produced in that portion of the recording medium represented by count 0 through 499 and that the vector or arrow is to be produced in that portion of the recording medium represented by counts 500 through 999, it can be seen that the first half of the recording medium will be available for regular logs and the second half of the recording medium will be available for vector or arrow-plot logs. Now referring again to FIG. 28 there is shown an example of a portion of a log having typical scale lines that may be produced by proper selection of counts to be decoded by decoding circuitry 222. FIG. 29 is illustrative of how the scale line shown in FIG. 28 may be produced by providing during each sweep of the electron beam a short unblanking pulse for the duration of particular counts comprising the horizontal sweep. The number below the pulses of FIG. 29 is representative of the count during which a pulse is provided. Thus, it can be seen that almost any desired scale line can be provided by proper selection of the counts used to provide unblanking pulses.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

I claim:

1. Apparatus for recording well logging data comprising:
   means for producing synchronizing signals representative of a recurring event;
   means for providing an energy beam having first and second beam deflection means and beam intensity control means;
   recording means sensitive to said energy beam;
   driving means responsive to said synchronizing signals and coupled to said first deflection means adapted for repetitively sweeping said energy beam along an axis of said recording means;
   means for interrupting selected sweeps of said energy beam at a selected location along said axis;
   means for providing first and second well logging data representative of subsurface characteristics at preselected depth intervals;
   means coupled to said intensity control means and responsive to said first well logging data for modulating the intensity of said energy beam during sweeps of said energy beam to produce first indicia on said recording means;

means coupled to said first and second beam deflection means and said intensity control means and responsive to said second well logging data for modulating the intensity and the location of said interrupted sweeps of said energy beam to produce second indicia on said recording means; and means for moving one of said recording means and said axis with respect to the other one such that indicia produced by successive sweeps of said energy beam are at spaced intervals on said recording means and are representative of well logging data at preselected depth intervals.

2. Apparatus for recording well logging data comprising:

means for producing synchronizing signals representative of a recurring event;

a cathode-ray tube having first and second deflection means and an intensity control means;

driving means responsive to said synchronizing signals and coupled to said first deflection means for providing a first signal to repetitively sweep the electron beam of said cathode-ray tube along an axis of the screen of said cathode-ray tube;

means for interrupting selected ones of said first signals to stop selected sweeps of said electron beam at a selected location along said axis;

means for providing first and second well logging data representative of subsurface characteristics at preselected depth intervals;

means coupled to said intensity control means and responsive to said first well logging data for modulating the intensity of said electron beam during sweeps of said electron beam to produce first indicia on said screen;

means coupled to said first and second deflection means and said intensity control means and responsive to said second well logging data for modulating the intensity and location of said electron beam while said selected sweeps of said electron beam are interrupted to produce second indicia on said screen;

a recording medium located adjacent said screen of said cathode-ray tube adapted for recording indicia produced thereon; and means for moving said recording medium such that indicia produced by successive sweeps of said electron beam along a first axis of said screen are recorded at spaced intervals along said recording medium and are representative of well logging data at preselected intervals.

3. Apparatus for recording well logging data comprising:

means for producing synchronizing signals representative of a recurrent event;

a cathode-ray tube having first and second deflection means and intensity control means;

directing means responsive to said synchronizing signal and coupled to said first deflection means for providing a first signal to repetitively sweep the electron beam of said cathode-ray tube along an axis of the screen of said cathode-ray tube;

means for interrupting selected ones of said first signal to stop selected sweeps of said electron beam at a selected location along said axis;

means for providing first and second well logging data representative of subsurface characteristics at preselected depth intervals;

means coupled to said intensity control means and responsive to said first well logging data for modulating the intensity of said electron beam during sweeps of said electron beam to produce first indicia on said screen;

means coupled to said first and second deflection means and said intensity control means and responsive to said second data for modulating the intensity and location of said electron beam while said selected sweeps of said signal are interrupted to produce second indicia on said screen; and means for relocating at spaced intervals the location of said axis along which successive sweeps of said electron beam move such that indicia produced by successive sweeps of said electron beam are located at spaced intervals and are representative of well logging data at preselected depth intervals.

4. Apparatus for recording well logging data comprising:

means for producing synchronizing signals representative of a recurring event;

means for providing an energy beam having first and second beam deflection means and beam intensity control means;

recording means sensitive to said energy beam;

directing means responsive to said synchronizing signals and coupled to said first deflection means and adapted for repetitively sweeping said beam of energy along an axis of said recording medium;

means for providing first and second well logging data representative of subsurface characteristics at selected depth intervals;

first control means coupled to said first and second deflection means and said intensity control means and responsive to said first well logging data for modulating at least the intensity and the location around said axis of said energy beam to produce first indicia on said recording medium;

second control means coupled to said first and second deflection means and said intensity control means and responsive to said second well logging data for modulating at least the intensity of said energy beam to produce second indicia on said recording means;

switching means for switching said first and second deflection means and said intensity control means between one of said first and second control means to the other one at a selected location on said axis; and means for moving one of said recording means and said axis with respect to the other one such that indicia produced by successive sweeps of said energy beam are at spaced intervals on said recording means and are representative of well logging data at preselected depth intervals.

5. Apparatus for recording well logging data comprising:

means for producing synchronizing signals representative of a recurring event;

a cathode-ray tube having a first and second deflection means and intensity control means;

means responsive to said synchronizing signals and coupled to said first deflection means for providing a first signal to repetitively sweep the electron beam of said cathode-ray tube along an axis of the screen of said cathode-ray tube;

means for providing first and second well logging data representative of subsurface characteristics from selected depth intervals;

first control means coupled to said first and second deflection means and said intensity control means and responsive to said first well logging data for modulating at least the intensity and location around said axis of said electron beam to produce first indicia on said screen;

second control means coupled to said first and second deflection means and said intensity control means and responsive to said second well logging data for modulating at least the intensity of said electron beam to produce second indicia on said screen;

switching means for selectively switching said second deflection means and said intensity control means between said first and second control means at a selected location along said axis;

a recording medium located adjacent said screen of said cathode-ray tube adapted for recording indicia produced on said screen; and means for moving said recording medium such that indicia produced by successive sweeps of said electron beam along a first axis of said screen are recorded at spaced intervals on said recording medium and are representative of well logging data at selected depth intervals.

6. Apparatus for recording well logging data comprising:

means for producing synchronizing signals representative of a recurring event;

a cathode-ray tube having first and second deflection means and intensity control means;

means responsive to said synchronizing signals and coupled to said first deflection means for providing a first signal to repetitively sweep the electron beam of said cathode-ray tube along an axis of the screen of said cathode-ray tube;

means for providing first and second well logging data representative of subsurface characteristics at selected depth intervals;

first control means coupled to said first and second deflection means and said intensity control means and responsive to said first well logging data for modulating at least the intensity and location around said axis of said electron beam to produce first indicia on said screen;

second control means coupled to said first and second deflection means and said intensity control means and responsive to said second well logging data for modulating at least the intensity of said electron beam to produce second indicia on said screen;

switching means for selectively switching said first and second deflection means and said intensity control means between said first and second control means at a selected location along said axis; and means for relocating at spaced intervals the location of said axis along which successive sweeps of said electron beam move such that indicia produced by successive sweeps of said electron beam are located at spaced intervals and are representative of well logging data at preselected depth intervals.

7. A method of recording well logging data comprising the steps of:

generating synchronizing signals representative of a recurring event;

repetitively sweeping an energy beam along an axis of a recording means in response to said synchronizing signals said recording means being sensitive to said energy beam;

modulating the intensity of said energy beam with first well logging data representative of subsurface characteristics at preselected depth intervals during sweeps of said energy beam to produce first indicia on said recording means;

interrupting selected sweeps of said energy beam at a selected location along said axis;

modulating the intensity and the location of said energy beam with second well logging data representative of subsurface characteristics at preselected depth intervals while said selected sweeps of said energy beam are interrupted to produce second indicia on said recording means; and moving one of said recording means and said axis with respect to the other one such that indicia produced by successive sweeps of said energy beam at spaced intervals on said recording means and are representative of well logging data at preselected depth intervals.

8. A method of recording well logging data comprising the steps of:

producing a synchronizing signal representative of a recurring event;

repetitively sweeping the electron beam of a cathode-ray tube along a first axis of the screen of said cathode-ray tube in response to said synchronizing signals;

modulating the intensity of said electron beam with first well logging data representative of subsurface characteristics at preselected depth intervals during sweeps of said electron beam to produce a first indicia on said screen;

interrupting selected sweep of said electron beam at a selected location along said first axis;

modulating the intensity and location of said electron beam with second well logging data representative of subsurface characteristics at preselected depth intervals while said selected sweeps of said electron beam are interrupted to produce second indicia on said screen;

recording on a first recording medium located adjacent said screen of said cathode-ray tube indicia produced on said screen; and moving said first recording medium such that indicia produced by successive sweeps of said electron beam along said axis of said screen are recorded at spaced intervals along said first recording medium and are representative of well logging data at preselected depth intervals.

9. A method of recording well logging data comprising the steps of:

producing synchronizing signals representative of a recurring event;

repetitively sweeping the electron beam of a cathode-ray tube along an axis of the screen of said cathode-ray tube in response to said synchronizing signals;

modulating the intensity of said electron beam with well logging data representative of subsurface characteristics at preselected depth intervals during sweeps of said electron beam to produce first indicia on said screen;

interrupting selected sweeps of said electron beam at a selected location along said axis;

modulating the intensity and location of said electron beam with well logging data representative of subsurface characteristics at preselected depth intervals while said selected sweeps of said signal are interrupted to produce second indicia on said screen; and relocating at spaced intervals the location of said axis along which successive sweeps of said electron beam move such that indicia produced by successive sweeps of said electron beam are located at spaced intervals and are representative of well logging data at preselected depth intervals.

10. A method of recording well logging data comprising the steps of:

producing synchronizing signals representative of a recurring event;

repetitively sweeping an energy beam along an axis of a recording means in response to said synchronizing signals, said recording means being sensitive to said energy beam;

modulating at least the intensity and the location around said axis of said energy beam with a signal from first control means responsive to well logging data representative of subsurface characteristics at selected depth intervals to produce first indicia on said recording means;

modulating at least the intensity of said energy beam with a signal from a second control means responsive to well logging data representative of subsurface characteristics at selected depth intervals to produce second indicia on said recording means;

switching between said first and second control means at a selected location on said axis; and moving one of said recording means and said axis with respect to the other one such that indicia produced by successive sweeps of said energy beam are at spaced intervals on said recording means and are representative of well logging data at preselected depth intervals.

11. A method of recording well logging data comprising the steps of:

generating synchronizing signals representative of a recurring event;

repetitively sweeping a beam of energy along an axis of a recording means in response to said synchronizing signals, said recording means being sensitive to said energy beam;

modulating the intensity of said energy beam with first well logging data representative of subsurface characteristics at preselected depth intervals during sweeps of said energy beam to produce first indicia on said recording means;

interrupting selected sweeps of said energy beam at a selected location along said axis;

simultaneously modulating both the intensity and the location of said energy beam with second well logging data representative of subsurface characteristics at preselected depth intervals while said selected sweeps of energy beam are interrupted to produce second indicia on said recording means which varies both in intensity and in location with respect to said axis as a function of said second well logging data; and moving one of said recording means and said axis with respect to the other one such that indicia produced by successive sweeps of said energy beam are at spaced intervals on said recording means and are representative of well logging data at preselected depth intervals.

12. The apparatus of claim 1 wherein said means coupled to said first and second beam deflection means and said intensity control means simultaneously modulates, in response to said second well logging data, the intensity and the location of said energy beam.

13. The apparatus of claim 2 wherein said means coupled to said first and second deflection means and said intensity control means simultaneously modulates, in response to said second well logging data, the intensity and the location of said energy beam.

* * * * *